(12) United States Patent
Lee et al.

(10) Patent No.: US 7,773,215 B2
(45) Date of Patent: Aug. 10, 2010

(54) DIGITAL SPECTROPHOTOMETER AND SPECTROLOGICAL METHOD

(75) Inventors: Jwh Lee, Dali (TW); Shih-Fang Wu, Dali (TW); Zi-Yu Liu, Nantou Hsien (TW); Zhe-Rui Zhang, Dali (TW)

(73) Assignee: Shin-Hsiang Huang (TW)

( * ) Notice: Subject to any disclaimer, the term of this patent is extended or adjusted under 35 U.S.C. 154(b) by 537 days.

(21) Appl. No.: 11/798,147

(22) Filed: May 10, 2007

(65) Prior Publication Data
US 2008/0278720 A1 Nov. 13, 2008

(51) Int. Cl.
*G01J 3/28* (2006.01)
(52) U.S. Cl. .................. 356/256; 356/328
(58) Field of Classification Search .......... 356/305, 356/328, 334, 256
See application file for complete search history.

(56) References Cited

U.S. PATENT DOCUMENTS

| | | | | |
|---|---|---|---|---|
| 2,975,669 A | * | 3/1961 | Jarrell et al. | 356/305 |
| 3,758,217 A | * | 9/1973 | Stokstad | 356/256 |
| 4,174,180 A | * | 11/1979 | Gebhart et al. | 356/338 |
| 5,999,255 A | * | 12/1999 | Dupee et al. | 356/301 |
| 7,304,814 B2 | * | 12/2007 | Tsao | 359/819 |

* cited by examiner

*Primary Examiner*—Kara E Geisel
(74) *Attorney, Agent, or Firm*—Hershkovitz & Associates, LLC; Abraham Hershkovitz

(57) ABSTRACT

A digital spectrophotometer and a spectrologial method for determining spectrum wavelength of an unknown illuminant, and the digital spectrophotometer has a base, an operating assembly and a photographic assembly. The operating assembly is attached to the base and has an operating pedestal, a rotating frame and a spectrometer. The rotating frame is connected rotatably to the operating pedestal. The spectrometer is connected solidly to the rotating frame. The photographic assembly is connected to the operating assembly. The spectrologial method is calculated the diffraction angle $\alpha_i$ and the wavelength of the unknown illuminant by putting the parameters into the into the first and second functions.

36 Claims, 23 Drawing Sheets
(10 of 23 Drawing Sheet(s) Filed in Color)

Digital Camera of Fuji S602, the width of the slit is 600lines/mm
Digital spectrograph of Hg, H and Na Lamp (up to down)

Fig. 12

Data Sheet of the digital spectrograph of Hg, H and Na Lamp
[Fuji S602 — diaphragm: 6, shutter: 1s, sensitivity: 160, focal length: 34mm, the incident angle: 15]

| Illuminant | Color | Red | red | yellow | Yellow | green | Green | blue | purple |
|---|---|---|---|---|---|---|---|---|---|
| H Known | Location(x) | 72.77 | | | | 37.3 | | 23.55 | 20.55 |
| | (R, G, B) | (36,2,0) | | | | (8,255,255) | | (0,2,107) | (3,1,78) |
| | λ (nm theory) | 656.3 | | | | 486.1 | | 434.3 | 410.2 |
| | $\Delta\lambda/\Delta x$ | | | | | 4.58 | | 4.51 | |
| Hg Unknown | Location (x) | Not development | | 58.72 | 58.23 | 51.31 | Not development | 26.59 | 19.61 |
| | (R, G, B) | | | (84,104,7) | (58,112,0) | (0,255,15) | | (2,8,250) | (1,2,154) |
| | λ (nm experiment) | | | 583.7 | 581.5 | 550.0 | | 437.6 | 405.8 |
| | λ (nm theory) | 690.8 | 656.3 | 579.1 | 577.0 | 546.1 | 491.6 | 435.8 | 407.8 |
| | Error % | | | 0.8 | 0.8 | 0.7 | | 0.4 | 0.5 |
| Na Unknown | Location (x) | Not development | | 61.08 | | Not development | Not development | | |
| | (R, G, B) | | | (250,196,0) | | | | | |
| | λ (nm experiment) | | | 594.5 | | | | | |
| | λ (nm theory) | 617.5 | | 589.6 | 589.0 | 568.8 | 497.8 | | |
| | Error % | | | 0.9 | | | | | |

Fig. 13

Coordinates diagram of Hg, H and Na Lamp with Fuji S602

Color diagram of curves with Fuji S602

Digital Camera of Nikon FM2 (100° positive) the width of the slit is 600lines/mm, Digital spectrograph of Hg, H and Na Lamp (up to down)

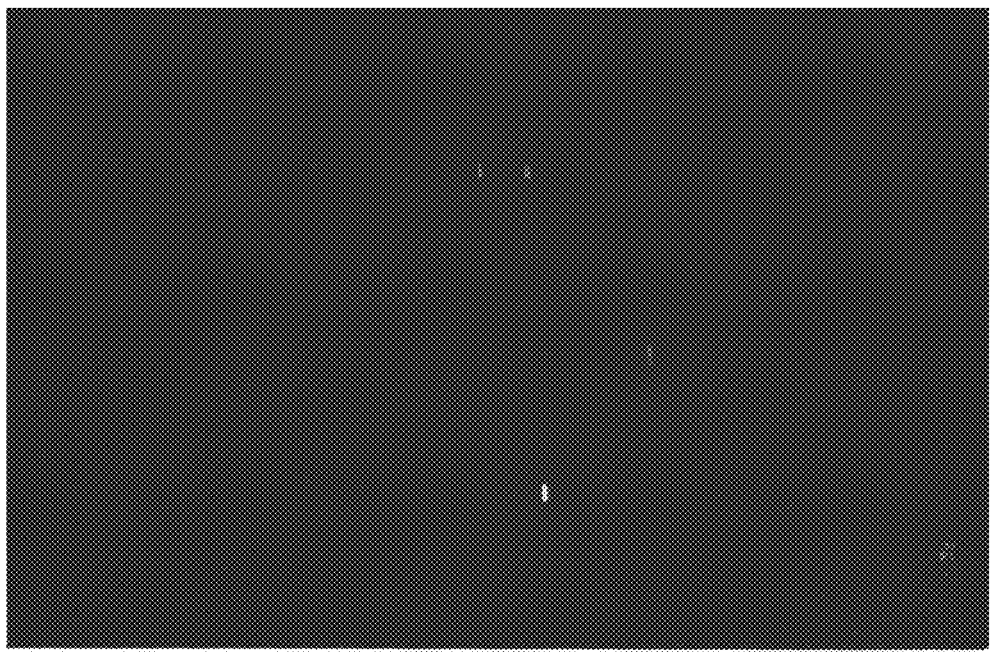

Fig. 16

Data Sheet of the digital spectrograph of Hg, H and Na Lamp
【Nikon FM2 — diaphragm : 8, shutter : 4s, sensitivity : 100, focal length : 85mm, the incident angle : 15】

| Illuminant | Color | red | red | yellow | yellow | green | green | blue | purple |
|---|---|---|---|---|---|---|---|---|---|
| H Known | Location(x) | 39.99 | | | | 18.68 | | 12.01 | 9.06 |
| | (R, G, B) | (239,78,77) | | | | (11,183,156) | | (20,22,100) | (21,16,35) |
| | λ (nm theory) | 656.3 | | | | 486.1 | | 434.3 | 410.2 |
| | Δλ/Δx | | | | | 7.99 | | 7.77 | |
| Hg Unknown | Location (x) | Not development | | 29.94 | 29.65 | 25.77 | Not development | 11.3 | Not development |
| | (R, G, B) | | | (61,195,87) | (70,197,92) | (77,198,105) | | (25,43,185) | |
| | λ (nm experiment) | | | 574.9 | 572.6 | 542.0 | | 432.0 | |
| | λ (nm theory) | 690.8 | 656.3 | 579.1 | 577.0 | 546.1 | | 491.6 | 435.8 |
| | Error % | | | 0.7 | 0.8 | 0.8 | | 0.9 | |
| Na Unknown | Location (x) | Not development | | 31.3 | | 28.59 | Not development | | |
| | (R, G, B) | | | (251,248,152) | | (43,174,89) | | | |
| | λ (nm experiment) | | | 585.6 | | 564.3 | | | |
| | λ (nm theory) | 617.5 | | 589.6 | 589.0 | 568.8 | | 497.8 | |
| | Error % | | | 0.6 | | 0.8 | | | |

Fig. 17

Coordinates diagram of Hg, H and Na Lamp with Nikon FM2

Color diagram of curves with Nikon FM2

Digital spectrograph of red, yellow, green LEDs and H Lamp with Digital Camera of Fuji S 602

Coordinates diagram of red, yellow, green LEDs and H Lamp with Fuji S602

Data Sheet of the digital spectrograph of H Lamp

| Color | purple | blue | green | red | Average |
|---|---|---|---|---|---|
| Wavelength λ (nm) | 410.2 | 434.3 | 486.1 | 656.3 | |
| coordinates (x) | 3.4 | 9.47 | 22.71 | 66.16 | |
| (R,G,B) | (2,0,74) | (0,0,216) | (1,249,250) | (255,0,18) | |
| $\dfrac{\Delta\lambda}{\Delta x}$ | 3.97 | 3.91 | 3.92 | | 3.94 |

Data Sheet of the digital spectrograph of red, yellow, green LEDs

| LED | Wavelength-range (nm) | the wavelength at the maximum of the red-line | the wavelength at the maximum of the green-line | the wavelength at the maximum of the blue-line |
|---|---|---|---|---|
| Red (RB-234HRS) | 594.3< λ <667.5 | λ =628.0nm coordinates (101,0,0) | λ =567.6nm 座標(39,4,0) | Close to zero |
| Yellow (RT3-434ACS) | 559.5< λ <638.1 | λ =599.6nm coordinates (255,110,0) | λ =567.6nm coordinates (255,142,0) | Close to zero |
| Green (RB-534YGCS) | 538.8< λ <602.4 | λ =587.6nm coordinates (60,18,0) | λ =567.6nm coordinates (0,99,0) | Close to zero |

Fig. 22

Digital spectrograph of two white LEDs and H Lamp with Digital Camera of Fuji S602

Coordinates diagram of two white LEDs and H Lamp with Fuji S602

Data Sheet of the digital spectrograph of H Lamp

| Color | purple | blue | green | red | Average |
|---|---|---|---|---|---|
| Wavelength λ (nm) | 410.2 | 434.3 | 486.1 | 656.3 | |
| coordinates (x) | 2.31 | 8.42 | 21.57 | 64.82 | |
| (R,G,B) | (5,6,88) | (16,23,255) | (0,252,252) | (252,21,51) | |
| $\frac{\Delta\lambda}{\Delta x}$ | 3.94 | 3.94 | 3.94 | | 3.94 |

Data Sheet of the digital spectrograph of two white LEDs

| LED | Wavelength-range (nm) | the wavelength at the maximum of the red-line | the wavelength at the maximum of the green-line | the wavelength at the maximum of the blue-line |
|---|---|---|---|---|
| white (upper) | 452.7< λ <667.9 | λ =597.6nm coordinates (27,13,2) | λ =507.3nm coordinates (7,34,17) | λ =474.4nm coordinates (5,12,67) |
| White (lower) | 440.1< λ <669.0 | λ =594.7nm coordinates (63,21,0) | λ =554.3nm coordinates (0,51,0) | λ =461.6nm coordinates (8,10,157) |

Fig. 25

Digital spectrograph of Na Lamp with Fuji S602, the width of the slit is 1200lines/mm Digital spectrograph of Na Lamp with NikonFM2, the width of the slit is 1200lines/mm Digital spectrograph of sun with Fuji S602 (Fraunhofer Lines)

Coordinates diagram of sun with Fuji S602 (Fraunhofer Lines)

Digital spectrograph of H Lamp with Fuji S602 in an external magnetic field about 0.5 Tesla (Zeeman Effect)

Coordinates diagram of H Lamp with Fuji S602 in an external magnetic field about 0.5 Tesla (Zeeman Effect)

DIGITAL SPECTROPHOTOMETER AND SPECTROLOGICAL METHOD

BACKGROUND OF THE INVENTION

1. Field of the Invention

The present invention relates to a digital spectrophotometer and a spectrologial method, and more particularly using a digital spectrograph from the digital spectrophotometer and image editing software to determine a wavelength of an unknown illuminant easily and precisely.

2. Description of Related Art

Gaseous atoms in an illuminantradiate a specific spectrum when the gaseous atoms are in an excited state, and users can determine what kinds of gaseous atoms are in the illuminant and the content of the gaseous atoms by analyzing the specific spectrum.

In senior high school, students use a triangular prism to analysis an illuminant and differentiate a specific spectrum of the illuminant by naked eyes. However, the analysis of the illuminant is inaccurate and cannot determine the colors of the specific spectrum.

In university, students analyze an illuminant with a monochromatic instrument that comprises a diffraction grating and multiple collimating lenses to determine the spectrum of the illuminant. Although the monochromatic instrument can determine the spectrum of the illuminant precisely, the monochromatic instrument is large and cumbersome, so users cannot carry the monochromatic instrument easily and quickly. Furthermore, the monochromatic instrument is expensive, and a professional technician is required to accurately calibrate the monochromatic instrument.

The digital spectrophotometer and the spectrologial method in accordance with the present invention mitigate or obviate the aforementioned problems.

SUMMARY OF THE INVENTION

The main objective of the present invention is to provide a digital spectrophotometer and a spectrologial method to determine a wavelength of an unknown illuminant easily and precisely.

The digital spectrophotometer and the spectrologial method determine a wavelength of an unknown illuminant. The digital spectrophotometer has a base, an operating assembly and a photographic assembly. The operating assembly is attached to the base and has an operating pedestal, a rotating frame and a spectrometer. The rotating frame is connected rotatably to the operating pedestal. The spectrometer is connected solidly to the rotating frame. The photographic assembly is connected to the operating assembly. The spectrologial method calculates the diffraction angle as and the wavelength of the unknown illuminant by putting the parameters into first and second functions.

Other objectives, advantages and novel features of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 12 is a digital spectrograph of the third experiment with the digital spectrophotometer in FIG. 1;

FIG. 13 is a data sheet of the third experiment with the digital spectrophotometer in FIG. 1;

FIG. 16 is another digital spectrograph of the third experiment with the digital spectrophotometer in FIG. 1;

FIG. 17 is another data sheet of the third experiment with the digital spectrophotometer in FIG. 1;

FIG. 22 is a data sheet of the fourth experiment with the digital spectrophotometer in FIG. 1;

FIG. 25 is a data sheet of the fifth experiment with the digital spectrophotometer in FIG. 1;

DETAILED DESCRIPTION OF THE PREFERRED EMBODIMENT

Figure 1:
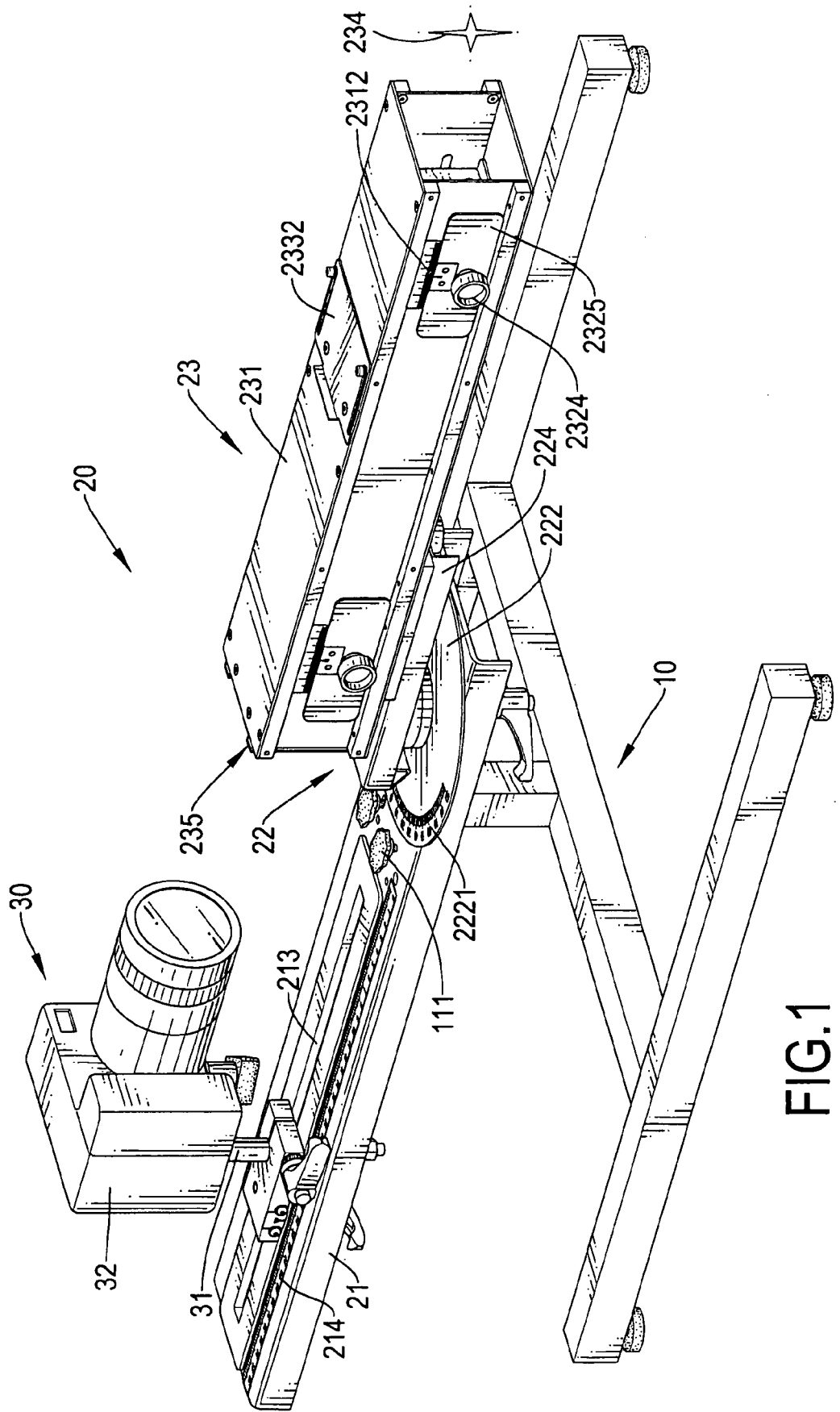
FIG. 1 is a perspective view of a digital spectrophotometer in accordance with the present invention.
Figure 2:
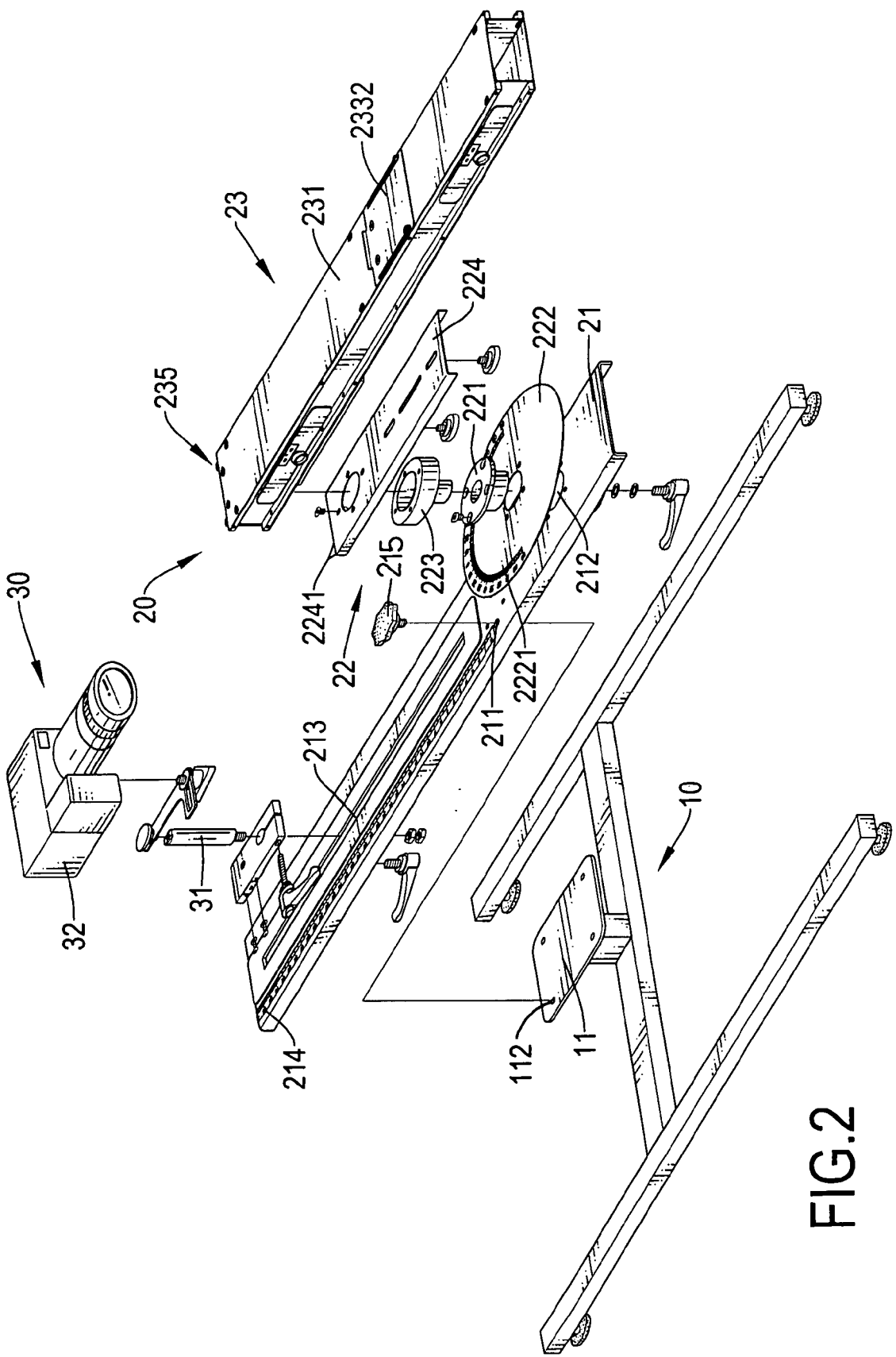
FIG. 2 is an exploded perspective view of the digital spectrophotometer in FIG. 1.

With reference to FIGS. 1 and 2, a digital spectrophotometer in accordance with the present invention has a base (10), an operating assembly (20) and a photographic assembly (30).

The base (10) may be H-shaped, has a middle and a mounting plate (11). The mounting plate (11) is mounted on the middle of the base (10) parallel to the base (10) and has multiple mounting holes (112). The mounting holes (112) are formed through the mounting plate (11). In a preferred embodiment, the base (10) can be a photographic frame.

The operating assembly (20) is attached to the base (10) and has an operating pedestal (21), a rotating frame (22) and a spectrometer (23). The operating pedestal (21) is attached parallel to the mounting plate (11) on the base (10) and has a front end, a rear end, a top, multiple connecting holes (211), multiple connectors (215), a through hole (212), an elongated slot (213) and an optional linear scale (214). The connecting holes (211) are formed through the operating pedestal (21) and align with the mounting holes (112) in the mounting plate (11). The connectors (215) extend respectively through the connecting holes (211) and are mounted respectively in the mounting holes (112) to connect the operating pedestal (21) to the mounting plate (11). The through hole (212) is formed in the operating pedestal (21) between the front end and the connecting holes (211). The elongated slot (213) is formed through the operating pedestal (21) between the connecting holes (211) and the rear end. The linear scale (214) is defined longitudinally on the top of the operating pedestal (21) beside the elongated slot (213).

The rotating frame (22) is connected rotatably to the operating pedestal (21) and has an optional mounting foot (221), an optional dial (222), an optional hub (223) and an optional mounting bracket (224). The mounting foot (221) is mounted in protrudes up from the through hole (212) in the operating pedestal (21). The dial (222) is connected to the mounting foot (221) over the operating pedestal (21) and has an outer edge and an angular scale (2221). The angular scale (2221) is defined on the dial (222) at the outer edge near the elongated slot (213) in the operating pedestal (21). The hub (223) is mounted rotatably in the mounting foot (221) over the dial (222). The mounting bracket (224) may be rectangular, is connected securely to the hub (223) over the mounting foot (221) and has a rear end and an indicator (2241). The indicator (2241) is formed in the rear end of the mounting bracket (224) over the angular scale (2221) on the dial (222).

Figure 3:
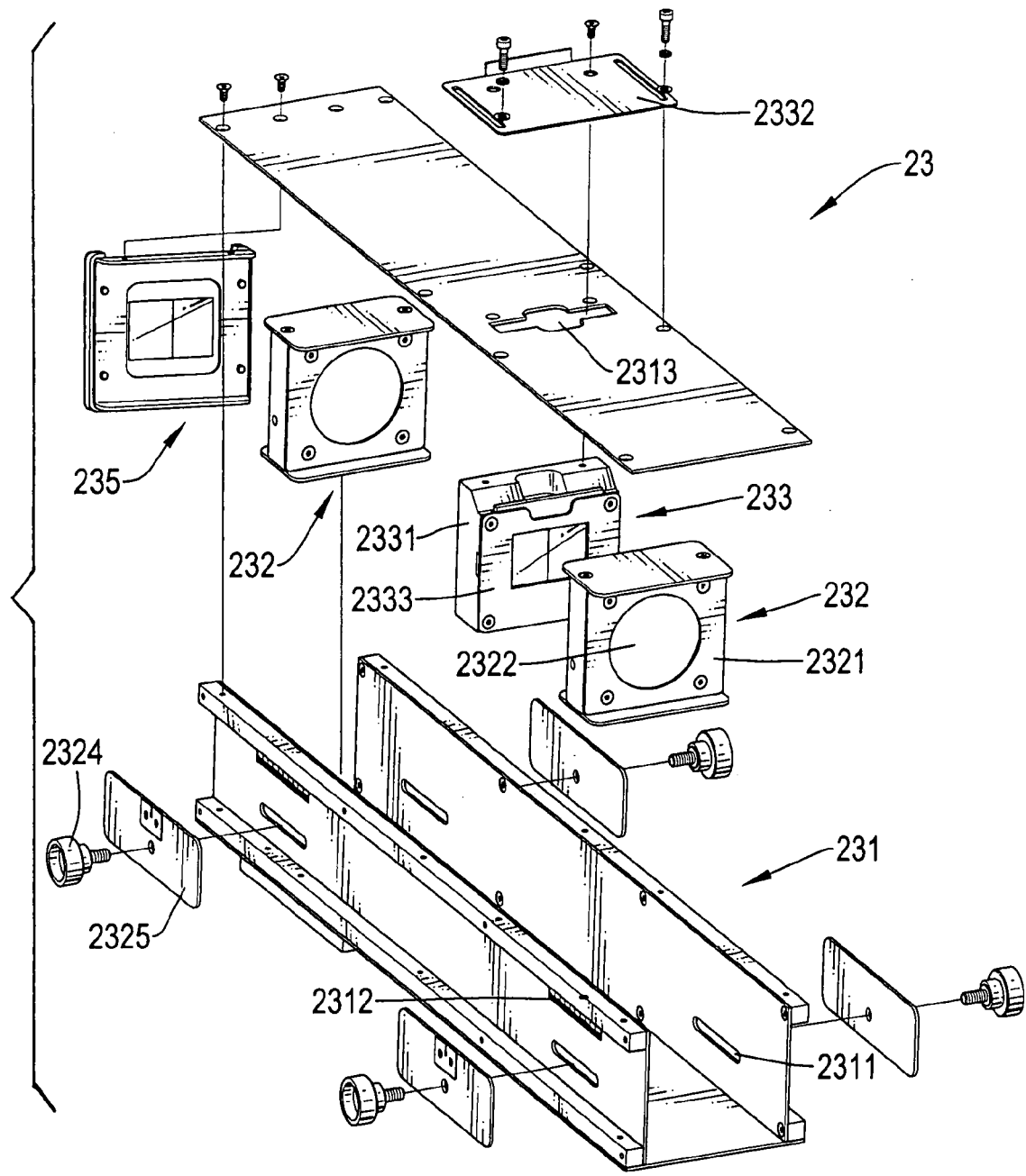
FIG. 3 is an exploded perspective view of a spectrometer in the digital spectrophotometer in FIG. 1.

With further reference to FIG. 3, the spectrometer (23) is connected securely to the rotating frame (22) and has a casing (231), a diffraction grating (235), an illuminant (234), two focusing lenses (232) and a collimator (233).

The casing (231) is hollow, may be a parallelepiped, is connected solidly to the mounting bracket (224) of the rotating frame (22) over the dial (222) and has a bottom, two sidewalls, a top, an open front end and an open rear end. The bottom of the casing (231) is connected to the mounting bracket (224) of the rotating frame (22) and has two longitudinal edges. The sidewalls are connected respectively to and protrude up from the longitudinal edges of the bottom of the casing (231), and each sidewall has two ends, two elongated holes (2311) and two linear scales (2312). The elongated holes (2311) are formed longitudinally in a corresponding sidewall respectively near the ends. The linear scales (2312) are defined on the sidewall respectively above the elongated holes (2311). The top of the casing (231) is connected to the sidewalls opposite to the bottom and has a mounting hole (2313). The mounting hole (2313) is formed transversely through the top of the casing (231) between the elongated holes (2311) in the sidewalls.

Figure 4:
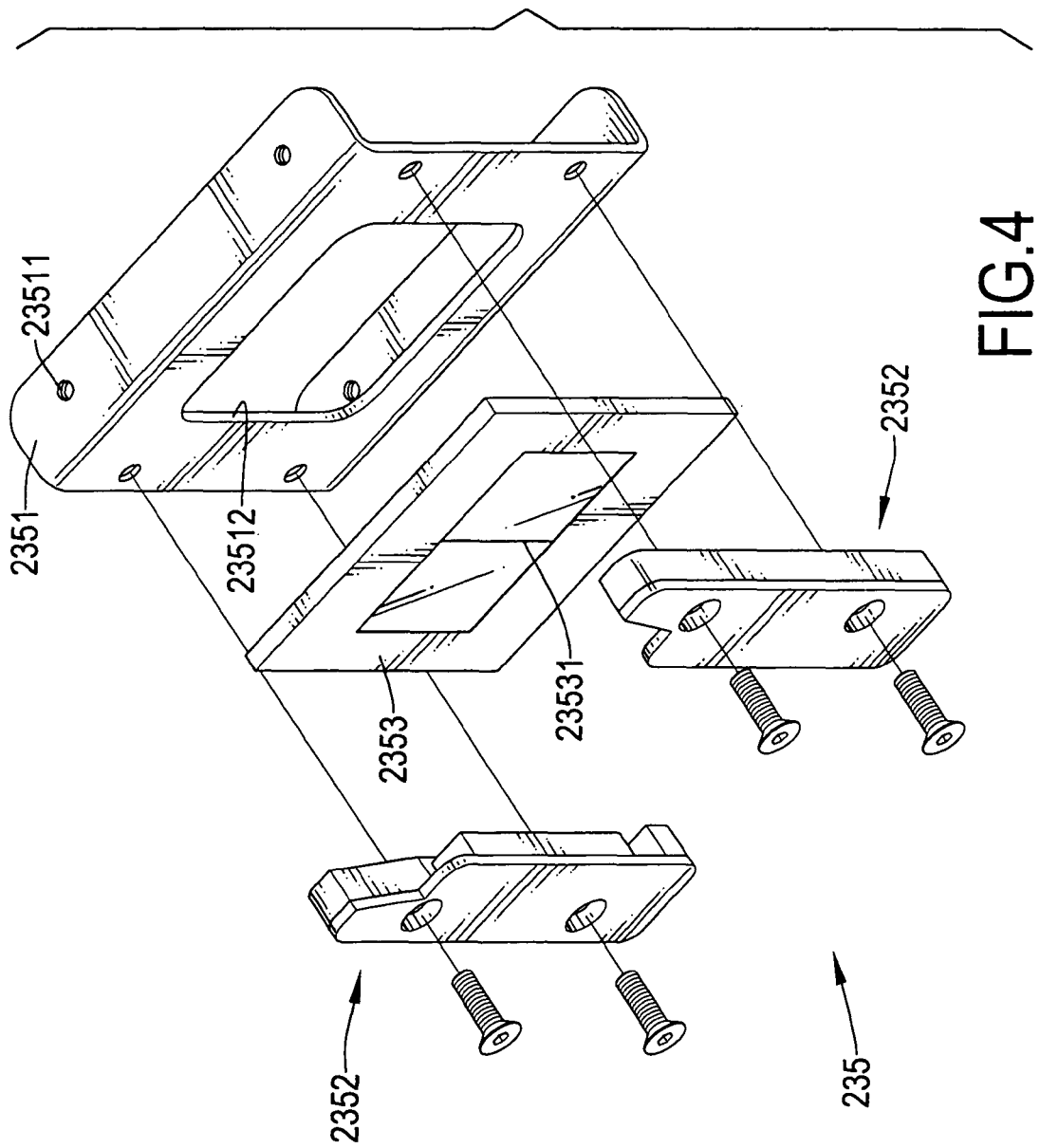
FIG. 4 is an exploded perspective view of a diffraction grating in the spectrometer in FIG. 3.

With further reference to FIG. 4, the diffraction grating (235) is mounted transversely in the casing (231) at the rear end and may be implemented with a mounting frame (2351), two connecting strips (2352) and a grating plate (2353).

The mounting frame (2351) is connected to the top and the bottom of the casing (231) at the rear end of the casing and has two sides, an upper lip, a lower lip, a center, a front surface, multiple optional threaded holes, multiple mounting holes (23511) and a through hole (23512).

The threaded holes are formed through the front surface respectively near the edges.

The mounting holes (23511) are formed through the upper lip and the lower lip of the mounting frame (2351). The mounting holes (23511) through the upper lip and the lower lip of the mounting frame (2351) connect respectively to the top and bottom of the casing (231). The through hole (23512) is formed through the center of the mounting frame (2351).

The connecting strips (2352) are connected to the front surface of the mounting frame (2351) diametrically opposite to each other outside the through hole (23512), and each connecting strip (2352) may have multiple mounting holes and multiple bolts. In a preferred embodiment, the bolts extend respectively through the mounting holes in the connecting strips (2352) and screw respectively into the threaded holes in the mounting frame (2351).

The grating plate (2353) is mounted between the front surface of the mounting frame (2351) and the connecting strips (2532) over the through hole (23512) and above the dial (222) and has a center and a grating (23531). The grating (23531) is formed in the center of the grating plate (2353) and communicates with the through hole (23512) in the mounting frame (2351). The grating (23531) has a width. The width of the grating (23531) is 600 lines/mm or 1200 lines/mm.

The illuminant (234) is mounted coaxially near the front end of the casing (231) and comprises a reference illuminant (234) and multiple determine illuminants (234). The reference illuminant (234) has a known wavelength. The determine illuminants (234) have unknown wavelengths.

Figure 5:
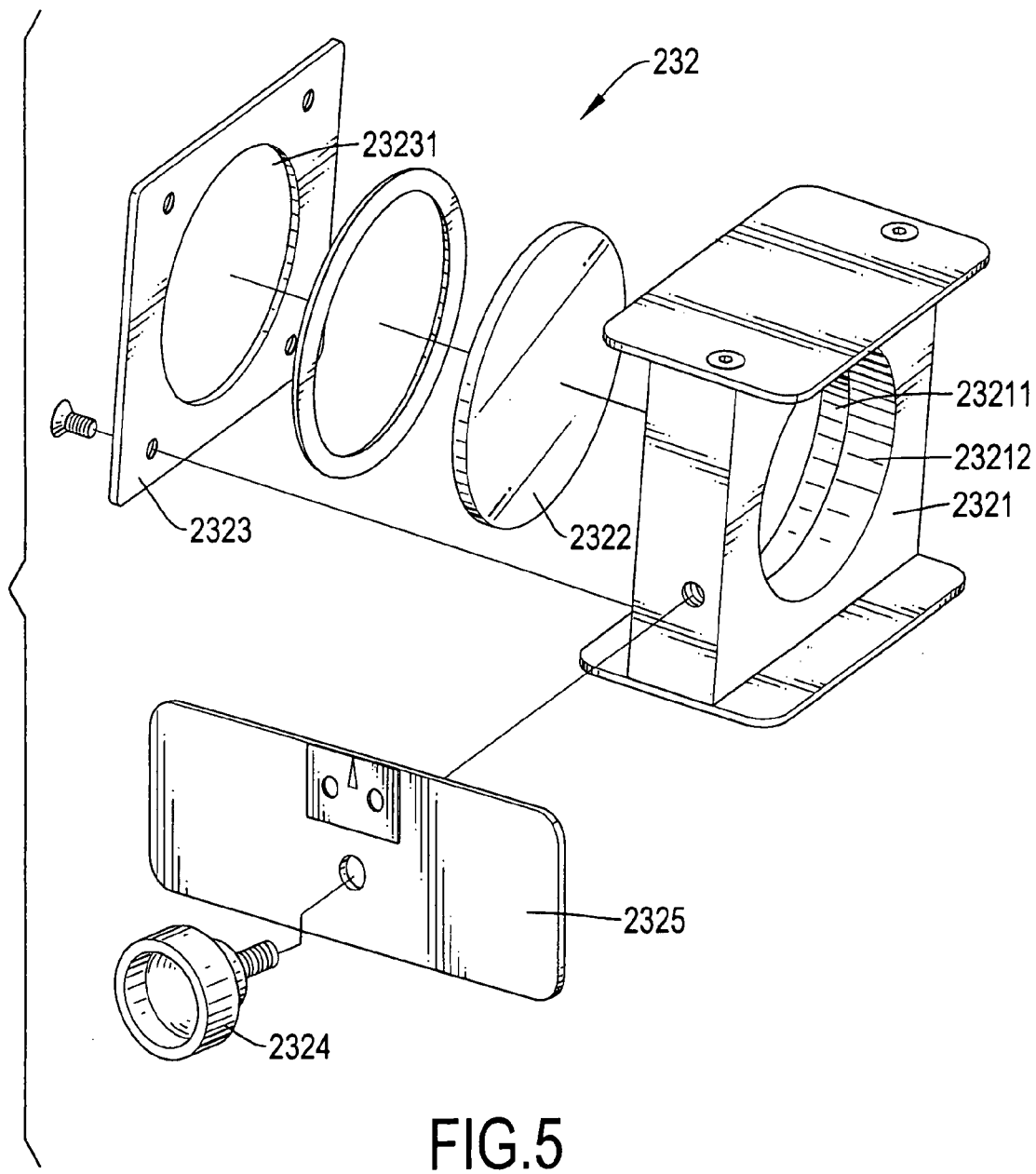
FIG. 5 is an exploded perspective view of a focusing lens in the spectrometer in FIG. 3.

With further reference to FIG. 5, the focusing lenses (232) are mounted slidably inside the casing (231) between the elongated holes (2311) respectively near the front and rear ends of the casing (231), and each focusing lens (232) may be implemented with a bracket (2321), a lens (2322) and a connecting plate (2323).

Figure 8:
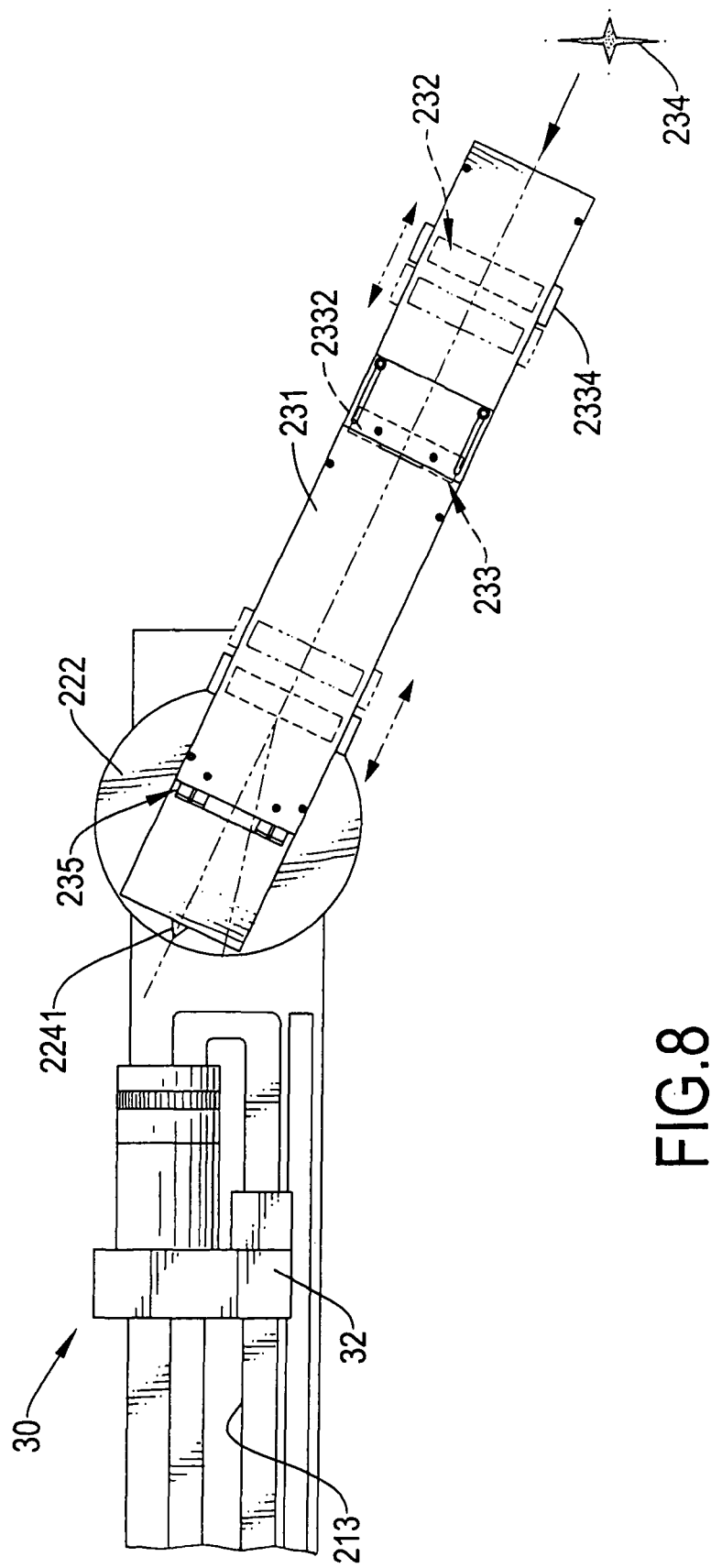
FIG. 8 is another operational top view of the digital spectrophotometer in FIG. 1.

The bracket (2321) is mounted slidably inside the casing (231) between corresponding elongated holes (2311) and has a center, two lens position indicators (2325), two knobs (2324), a mounting recess (23211) and a through hole (23212). The lens position indicators (2325) are slidably mounted respectively against the sidewalls of the casing (231) respectively below the linear scales (2312) on the sidewalls of the casing (231) to indicate the location of the brackets (2321) and have a top edge, a pointer and a through hole. The pointer is formed at the top edge and aligns with the corresponding linear scale (2312). The through hole is formed through the lens position indicator (2325) and aligns with the corresponding elongated hole (2311). Each knob (2324) has a longitudinal shaft. The longitudinal shaft extends through the through hole in the lens position indicator (231) and the corresponding elongated hole (2311) in the sidewall of the casing (231) and is connected to the bracket (2321). With further reference to FIG. 8, the brackets (2321) is adjusted by pushing or pulling the knobs (2324) along the corresponding elongated holes (2311) in the casing (231). The mounting recess (23211) is formed in the center of the bracket (2321) and has a diameter. The through hole (23212) is formed in the center of the bracket (2321) concentrically with the mounting recess (23211) has a diameter. The diameter of the mounting recess (23211) is larger than the diameter of the through hole (23212).

The lens (2322) is mounted coaxially in the mounting recess (23211) in the bracket (2321) to focus the illuminant (234).

The connecting plate (2323) is connected to the bracket (2321) concentrically over the mounting recess (23211) and has a through hole (23231). The through hole (23231) is formed through the connecting plate (2323) and corresponds to the mounting recess (23211).

Figure 6:
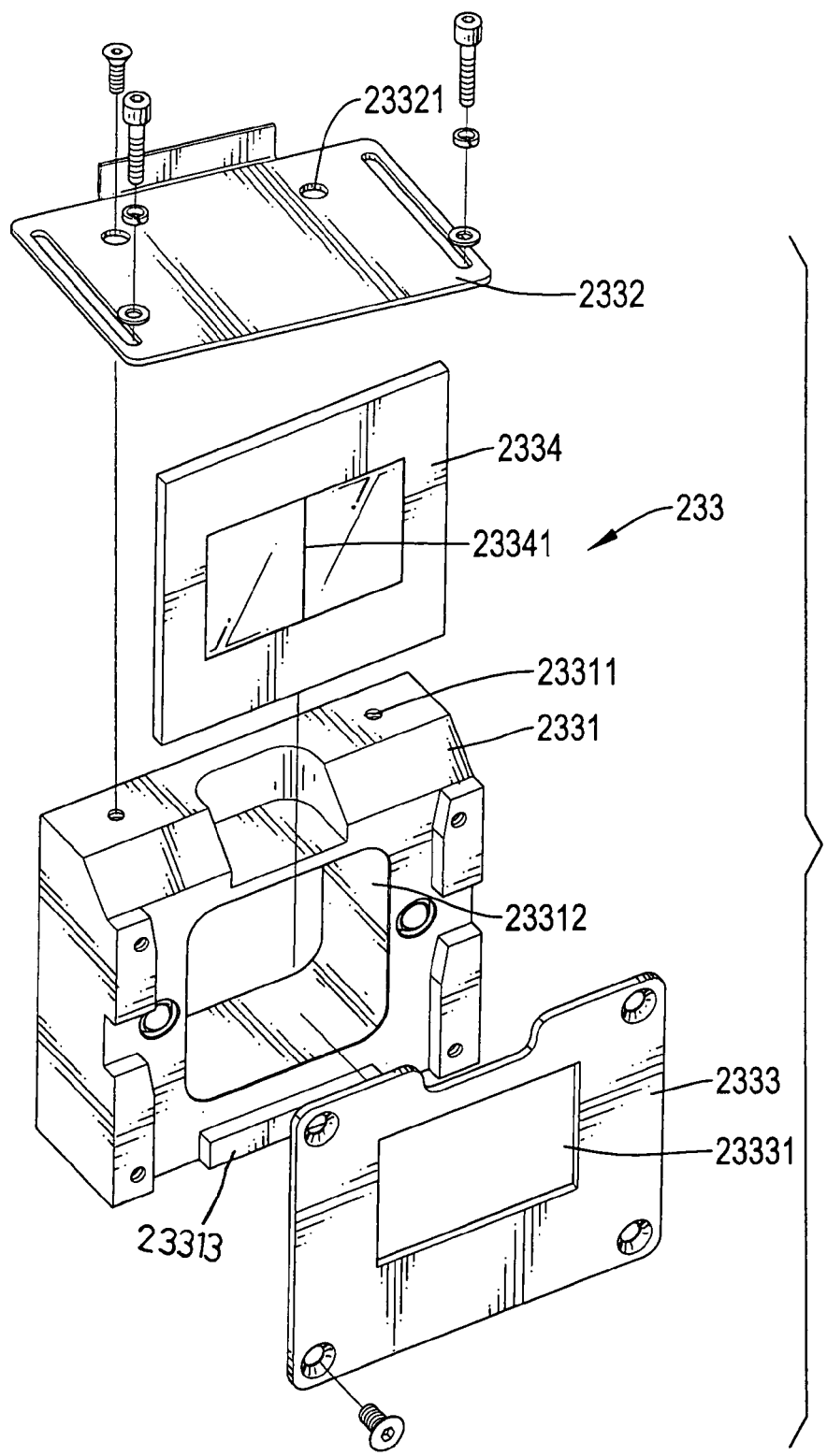
FIG. 6 is an exploded perspective view of a collimator in the spectrometer in FIG. 3.

With further reference to FIG. 6, the collimator (233) is mounted inside the casing (231) below the mounting hole (2313) in the casing (231) and between the focusing lenses (232) and may be implemented with a seat (2331), a cover (2332), a mounting plate (2333) and a collimating plate (2334).

The seat (2331) is mounted inside the casing (231), is aligned with the mounting hole (2313) in the casing (231) and has a top, a bottom, a front surface, multiple connecting holes (23311), a central through hole (23312) and a transverse foot (23313). The connecting holes (23311) are formed in the top of the seat (2331). The central through hole (23312) is formed through the seat (2331) and is aligned with the casing (231). The transverse foot (23313) is formed on and protrudes from the front surface of the seat (2331) near the bottom of the seat (2331).

The cover (2332) is connected adjustably to the top of the casing (231) over the mounting hole (2313), is connected securely to the seat (2331), has multiple connecting holes (23321) and may have multiple bolts. The connecting holes (23321) are formed in the cover (2332) and align respectively with the connecting holes (23311) in the seat (2331). In a preferred embodiment, the bolts connect the cover (2332) to the casing (231) and the seat (2331) and screw respectively into the cover (2332) and the seat (2331).

The collimating plate (2334) is mounted on the front surface of the seat (2331) on the transverse foot (23313) and has a slit (23341). The slit (23341) is formed in the collimating plate (2334) and communicates with the central through hole (23312) and has a width. The width of the slit (22341) is 01.mm.

The mounting plate (2333) is connected to the front surface of the seat (2331), is mounted against the transverse foot (23313), holds the collimating plate (2334) against the front surface of the seat (2331) and has a through hole (23331). The through hole (23331) is formed through the mounting plate (2333) and communicates with slit (23341) in the collimating plate (2334) and the central through hole (23312) in the seat (2331).

The photographic assembly (30) is connected to the operating assembly (20) and has a mounting post (31) and a photographic device (32). The mounting post (31) extends through the elongated slot (213) in the operating pedestal (21), is connected to the operating pedestal (21) and has an upper end. The photographic device (32) is connected to the upper end of the mounting post (31) and faces the spectrometer (23). In a preferred embodiment, the photographic device (32) can be a digital camera, a conventional camera or a charge-coupled device (CCD).

Figure 7:
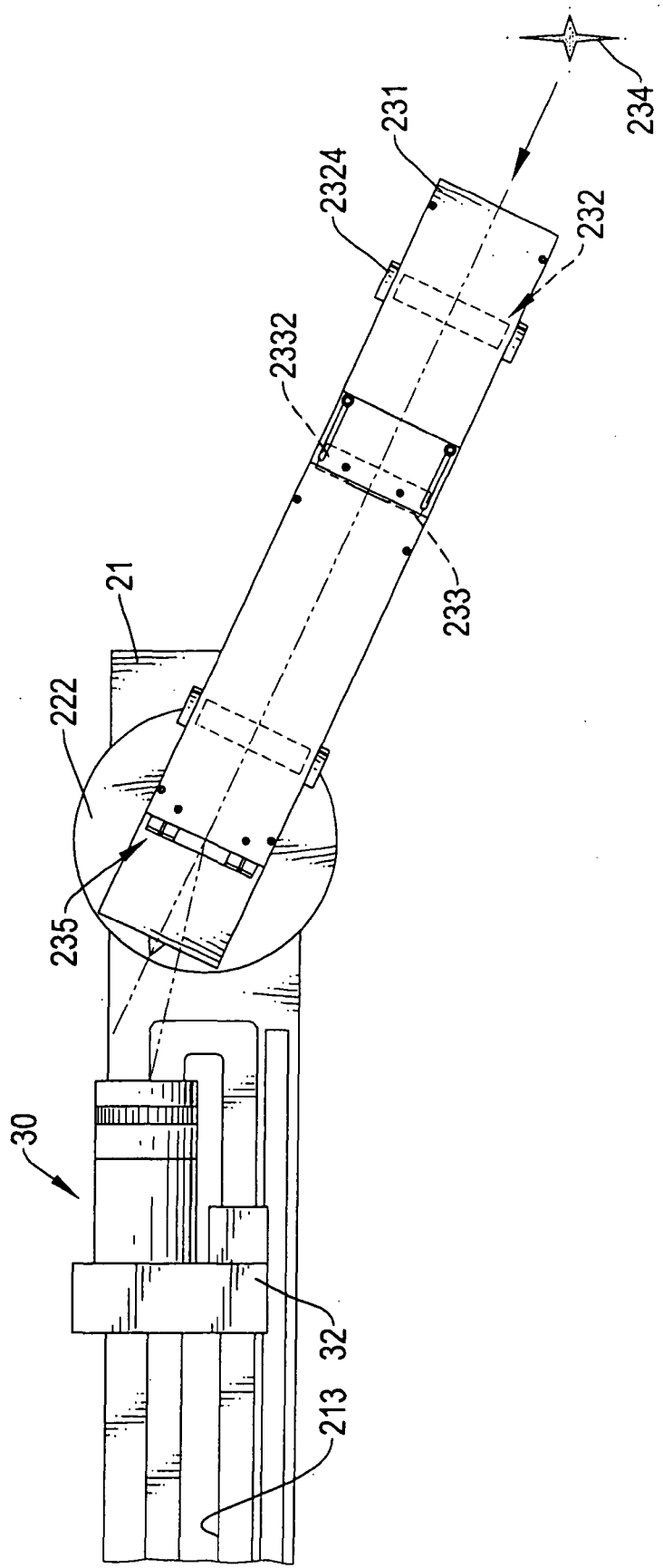
FIG. 7 is an operational top view of the digital spectrophotometer in FIG. 1.

With further reference to FIG. 7, the rotating frame (22) is rotated or the mounting post (31) is moved to measure a diffraction angle of the illuminant (234) radiating from the rear end of the casing (231), the lenses (2322), the slit (23341) and the grating (23531) into the photographic assembly (30).

The photographic device (32) stores and transforms the illuminant (234) to a digital spectrograph. In addition, diffraction angle data can be obtained from the angular scale (2221) on the dial (222) and the indicator (2241) in the mounting bracket (224).

Figure 9:
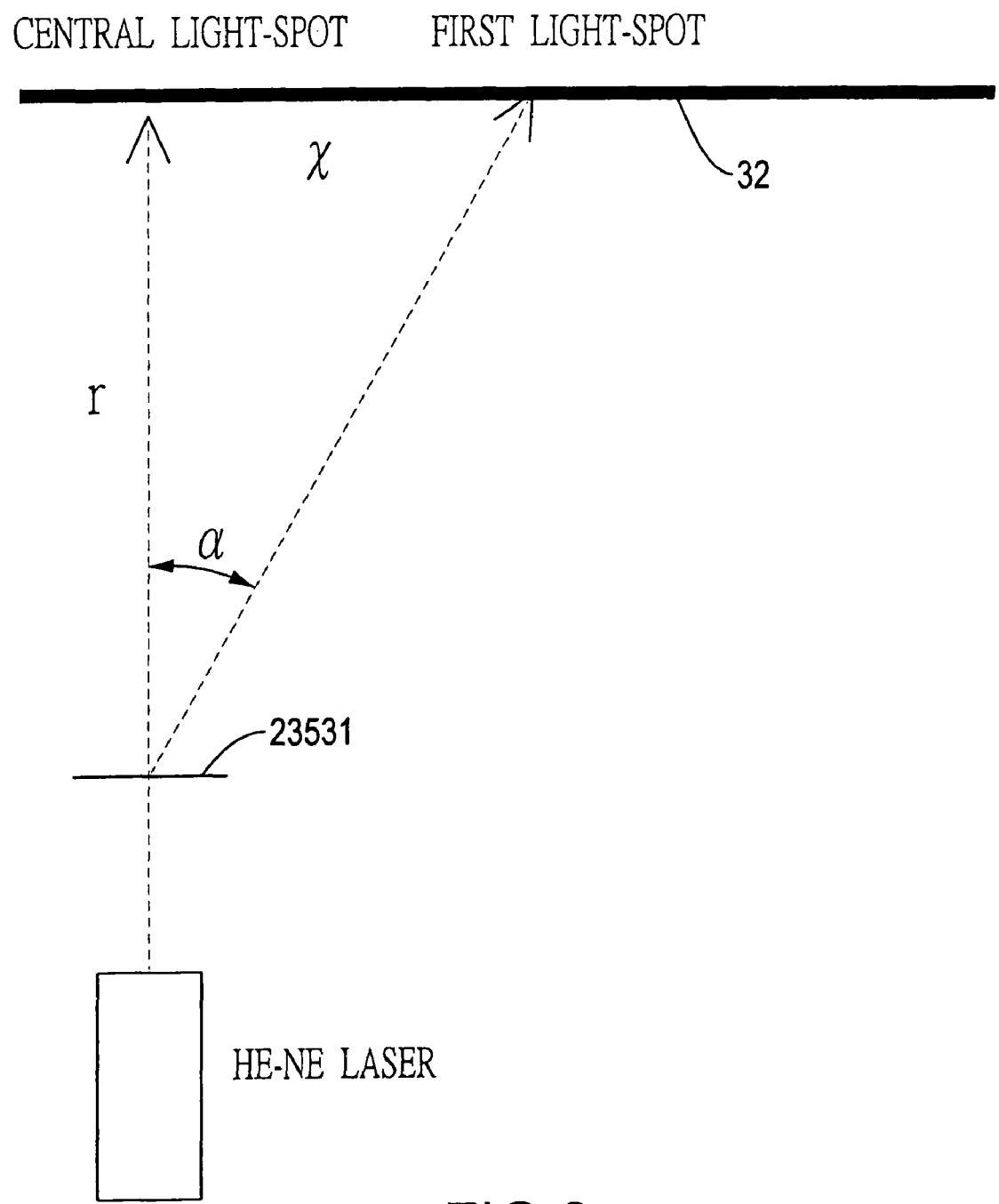
FIG. 9 is an operational diagram of a first experiment with the digital spectrophotometer in FIG. 1.

The spectrologial method of this invention as follows. With reference to FIG. 9, a first experiment with the digital spectrophotometer has a helium-neon Laser (He—Ne Laser) (the actual wavelength λ=632.8 nm) as the illuminant (234) vertical shooting from the grating (23531) into the photographic device (32). The width of the grating (23531) is d and the d is 600 lines/mm. The distance between the grating (23531) and the photographic device (32) is γ. The distance between a central light-spot and a first light-spot is χ, the diffraction angle of the central light-spot and the first light-spot is α. Then, user can use a trigonometric function and a diffraction formula to calculate the diffraction angle (α) and the wavelength (λ):

$$\text{in the diagram: } \tan\alpha = \frac{\chi}{\gamma} \cong 0.41 \therefore \alpha \cong 22.3°$$

$$\text{the diffraction formula: } d \cdot \sin\alpha =$$

$$\lambda \therefore \frac{10^{-3}}{600} \times \sin 22.3° \cong 6.322 \times 10^{-7} \text{ m} = 632.2 \text{ nm} = \lambda$$

According to the diffraction formula, the wavelength (λ) of the He—Ne Laser is 632.2 nm that approximate to the actual wavelength (λ) of the He—Ne Laser (632.8 nm). This result can prove the trustworthiness of the diffraction formula.

Figure 10:
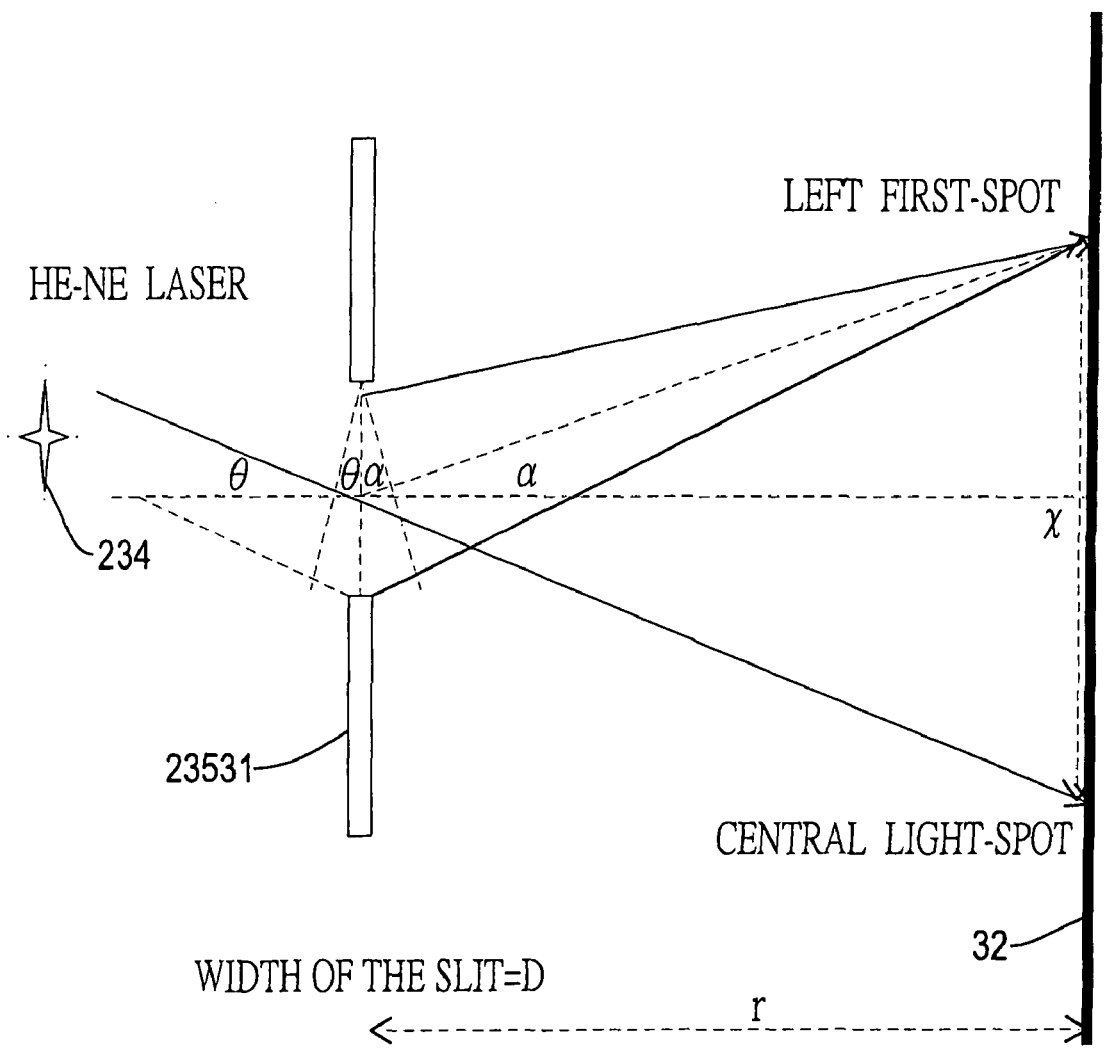
FIG. 10 is an operational diagram of a second experiment with the digital spectrophotometer in FIG. 1.

With reference to FIG. 10, a second experiment with the digital spectrophotometer has a He—Ne Laser (the actual wavelength λ=632.8 nm) as the illuminant (234) with an incident angle θ shooting from the grating (23531) into the photographic device (32). The width of the grating (23531) is d and the d is 600 lines/mm. The distance between the grating (23531) and the photographic device (32) is γ. The distance between a central light-spot and a left first light-spot is χ, the diffraction angle is α. Then, user can use a trigonometric function and a diffraction formula to calculate the diffraction angle (α):

After repetitive experiments, the average wavelength (λ) of the He—Ne Laser is 631.6 nm that approximate to the actual wavelength (λ) of the He—Ne Laser (632.8 nm). This result can prove the trustworthiness of the diffraction formula.

Figure 11:
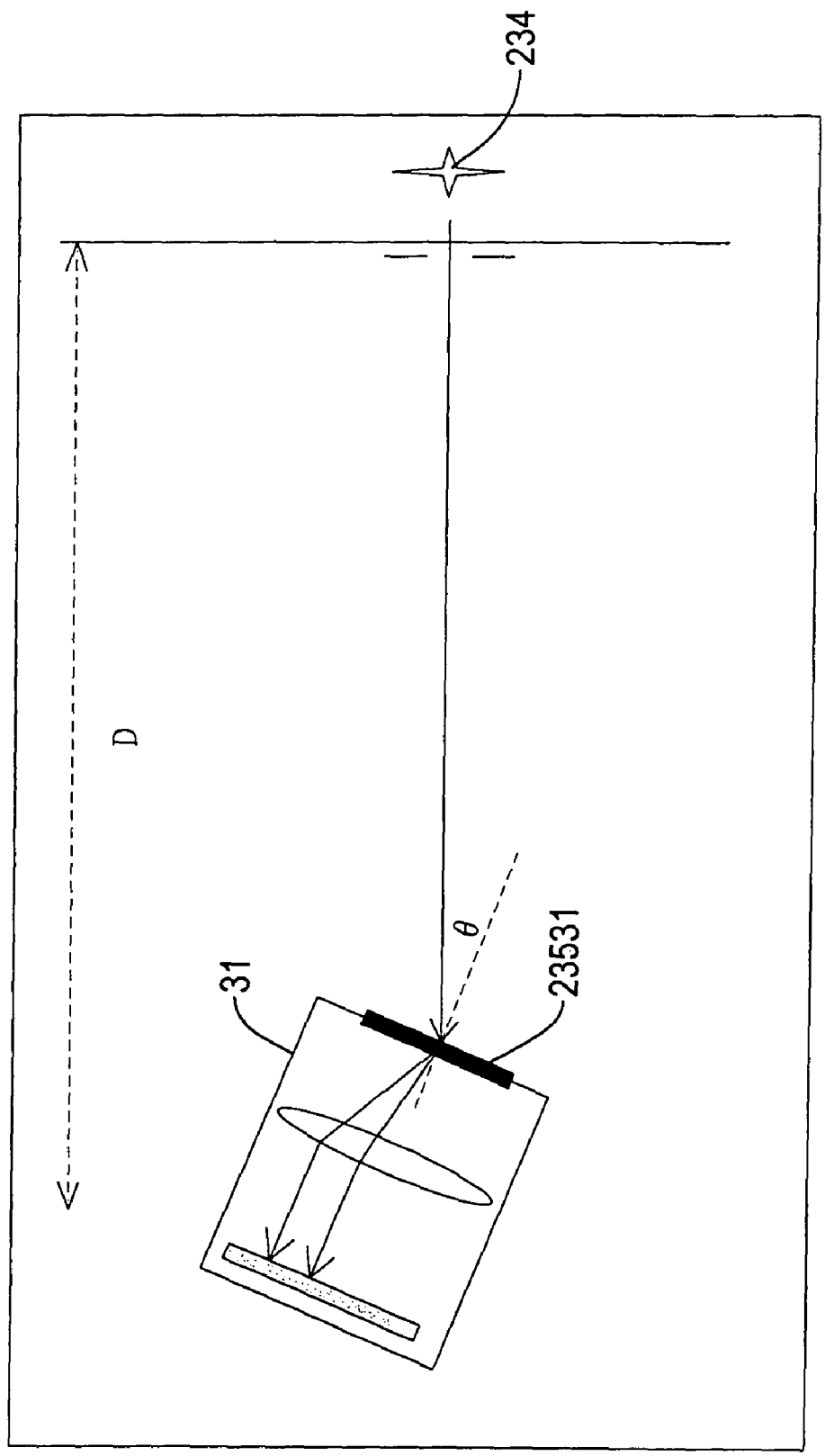
FIG. 11 is an operational diagram of a third experiment with the digital spectrophotometer in FIG. 1.

With reference to FIG. 11, a third experiment with the digital spectrophotometer has a hydrogen-Lamp (H) (the actual wavelength λ=632.8 nm) as the reference illuminant (234), mercury-Lamp (Hg) and sodium-Lamp (Na) as the determine illuminants (234) with an incident angle θ=17° shooting from the grating (23531) into the photographic device (32). The H, Hg and Na Lamps are aligned vertically. The distance between the illuminants (234) and the photographic device (32) is D=380 cm. The width of the grating (23531) is 600 lines/mm. The distance between the grating (23531) and the photographic device (32) is γ. the distance γ is a constant and the photographic device (32) is a digital camera of Fuji S602. According to the diffraction formula:

$$\lambda = \frac{d(\sin\alpha + \sin\theta)}{\cos\theta}$$

-continued $$\chi = \gamma\tan\alpha + \gamma\tan\theta \Rightarrow \tan\alpha = \frac{\chi}{\gamma} - \tan\theta$$

wherein d is the width of the grating (23531), $\lambda$ i is the wavelength of the H-Lamp, $\alpha$ i is a corresponding diffraction angle, $\chi$ i is a distance between the spectrums and the central light-spot. With reference to FIG. 12, the range of the wavelength from the infrared light to the ultraviolet light is 410.2 nm $\leq \lambda \leq$ 656.3 nm. Putting the range of the wavelength into the formula (1), and the range of the diffraction angle is $-7.6° \leq \alpha \leq 6.6°$. Therefore, $0.98 \leq \cos^3\alpha \leq 1$. Then, differentiation with the formulas (1) and (2) respectively:

$$\text{different formula(1)}: \frac{\Delta\lambda}{\Delta\alpha} = \frac{d \cdot \cos\alpha}{\cos\theta}$$

$$\text{different formula(2)}: \Delta\chi = \gamma \cdot \sec^2\alpha \cdot \Delta\alpha$$

$$\text{then } \frac{\Delta\lambda}{\Delta\chi} \cong \frac{\Delta\lambda}{\gamma \cdot \sec^2\alpha \cdot \Delta\alpha} = \frac{d \cdot \cos^3\alpha}{\gamma \cdot \cos\theta} = constant \cdot \cos^3\alpha \cong \text{constant}$$

wherein $\Delta\lambda$ is a wavelength difference of the two neighboring spectrums, $\Delta\alpha$ is an included angle of the diffraction angles of the two neighboring spectrums, $\Delta\chi$ is a distance of the two neighboring spectrums in the photographic assembly (30).

According to the above-mentioned, when users has known the wavelengths ($\lambda$) and the location ($\chi$) of three spectrums, they can calculate the value of $$\frac{\Delta\lambda}{\Delta\chi},$$

and calculate the wavelengths of the unknown spectrums in proportion to the locations.

Figure 14:
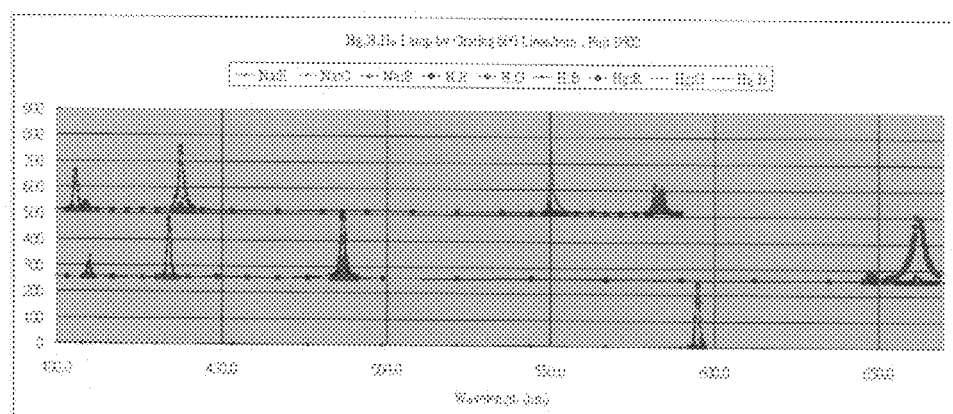
FIG. 14 is a coordinates diagram of the third experiment with the digital spectrophotometer in FIG. 1.

Afterwards, users import the digital spectrographs that took from the photographic assembly (30) into a computer. Then, enlarging the digital spectrographs to a mosaic scale and regarding each mosaic as a color block and has the same color coordinates ($\chi$, R, G, B) by an image editing software, wherein the R is red, the G is green and the B is blue. By the formula of $$\frac{\Delta\lambda}{\Delta\chi} = \text{constant}$$

and the color coordinates ($\chi$, R, G, B), user can transform the color coordinates ($\chi$, R, G, B) as a coordinates ($\lambda$, R, G, B) and drafting a coordinates diagram as FIG. 14 to determine the wavelengths of the unknown spectrums.

Figure 15:
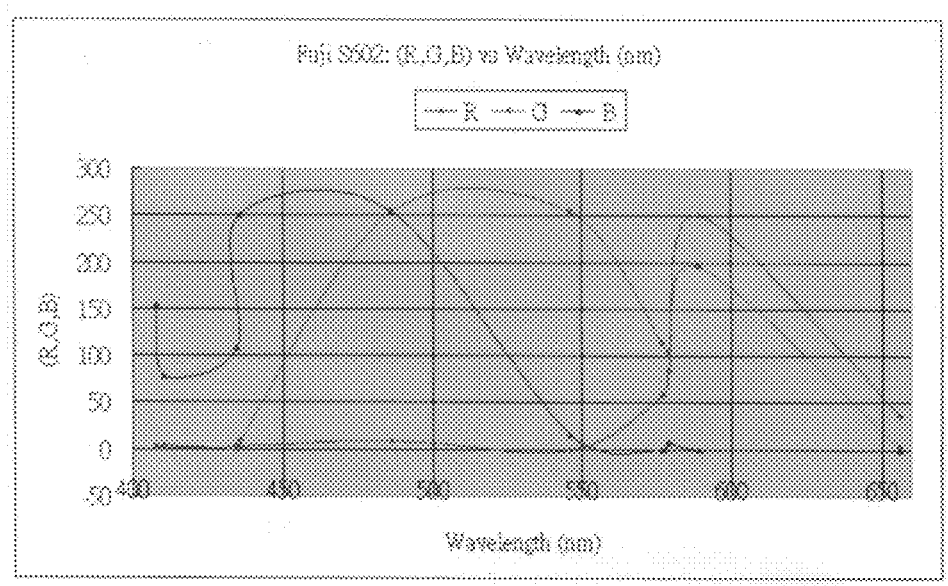
FIG. 15 is a color diagram of curves of the third experiment with the digital spectrophotometer in FIG. 1.

With reference to FIG. 13, the data of the wavelengths of Hg and Na are close to the theory value with 1% error. This result can prove the trustworthiness of the formulas (1) and (2). With reference to FIG. 15, regarding each spectrum as a monochromatic light to draw a color-wavelength diagram with the digital camera of Fuji S602.

Figure 18:
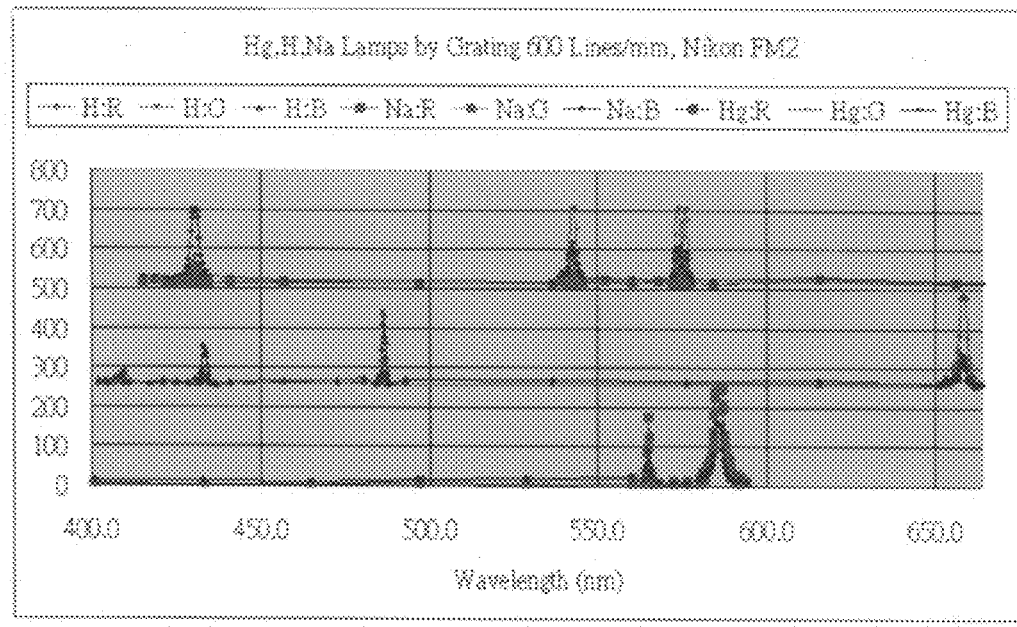
FIG. 18 is another coordinates diagram of the third experiment with the digital spectrophotometer in FIG. 1.
Figure 19:
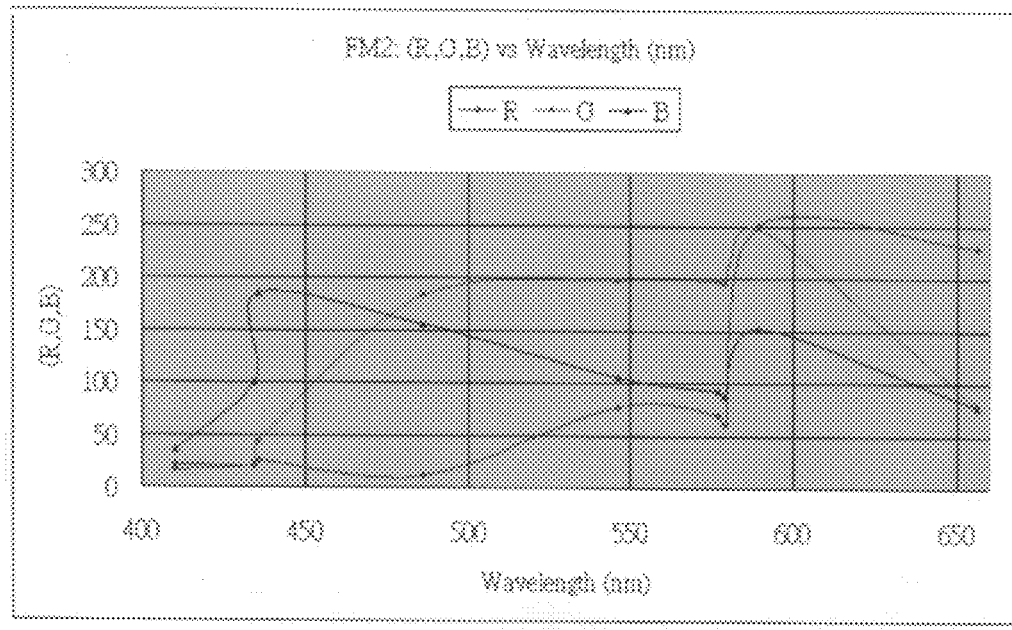
FIG. 19 is another color diagram of curves of the third experiment with the digital spectrophotometer in FIG. 1.

With reference to FIGS. 16 to 19, the figures are performed with another photographic device (32) in the third embodiment. The photographic device (32) is a conventional camera of Nikon FM2 with 100° positive. Users also can draft a coordinates diagram as shown in FIG. 18 by transforming the color coordinates ($\chi$, R, G, B) as a coordinates ($\lambda$, R, G, B). The data of the wavelengths of Hg and Na are shown in FIG. 17 and close to the theory value with 1% error. Regarding each spectrum as a monochromatic light to draw a color-wavelength diagram as shown in FIG. 19 with the conventional camera of Nikon FM2.

In the figures FIG. 15 and FIG. 19, users can compare the development characteristics of different photographic devices (32) (Fuji S602 and Nikon FM2) and using the results to determine the differences of the different photographic devices (32) in the market.

Figure 20:
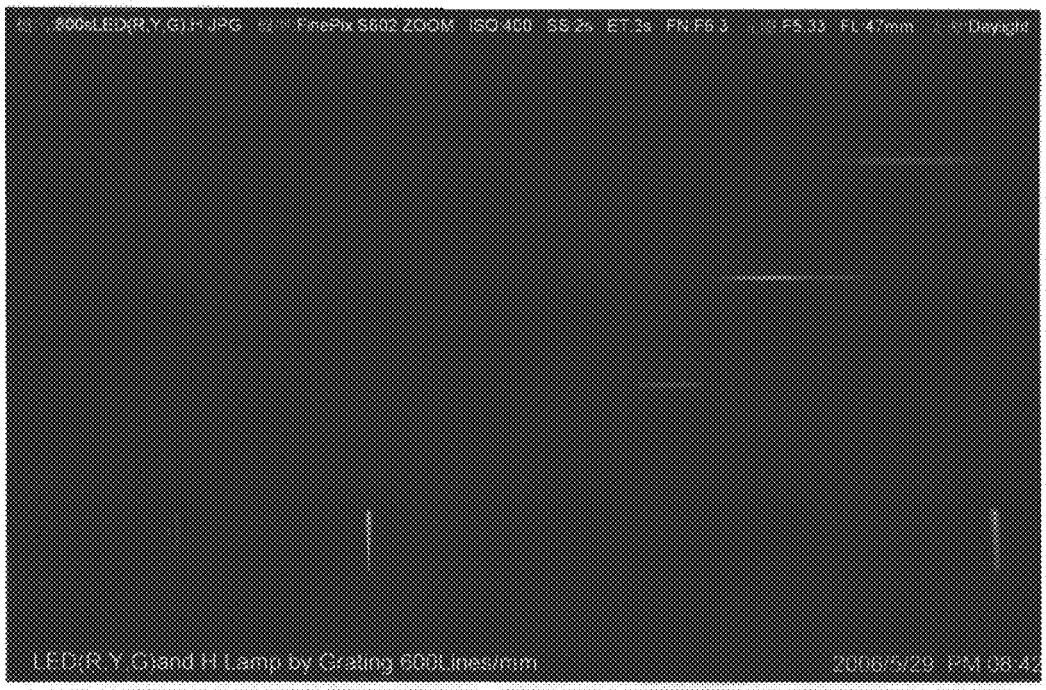
FIG. 20 is a digital spectrograph of the fourth experiment with the digital spectrophotometer in FIG. 1.
Figure 21:
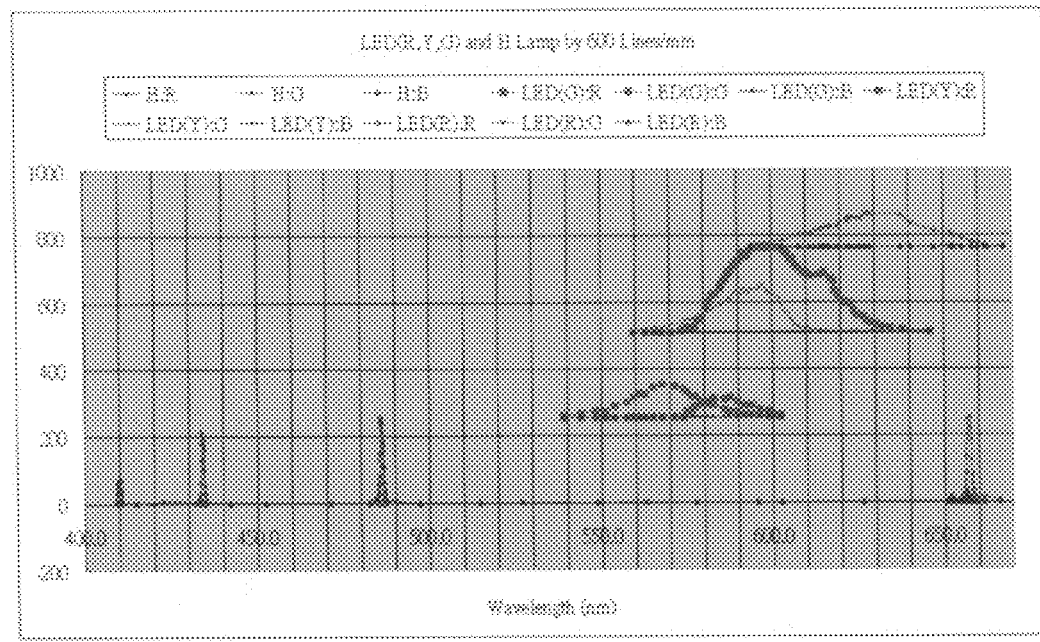
FIG. 21 is a coordinates diagram of the fourth experiment with the digital spectrophotometer in FIG. 1.

With reference to FIG. 20, a fourth experiment with the digital spectrophotometer has a hydrogen-Lamp (H) as the reference illuminant (234), red-LED, yellow-LED and green-LED as the determine illuminants (234) with an incident angle $\theta=17°$ shooting from the grating (23531) into the photographic device (32). The distance between the illuminants (234) and the photographic device (32) is D=3.20 m. The width of the grating (23531) is 600 lines/mm. The photographic device (32) is a digital camera of Fuji S602. Drafting a coordinates diagram as shown in FIG. 21 by transforming the color coordinates ($\chi$, R, G, B) as a coordinates ($\lambda$, R, G, B). The data of the wavelengths of H, red-LED, yellow-LED and green-LED are shown in FIG. 22.

Figure 23:
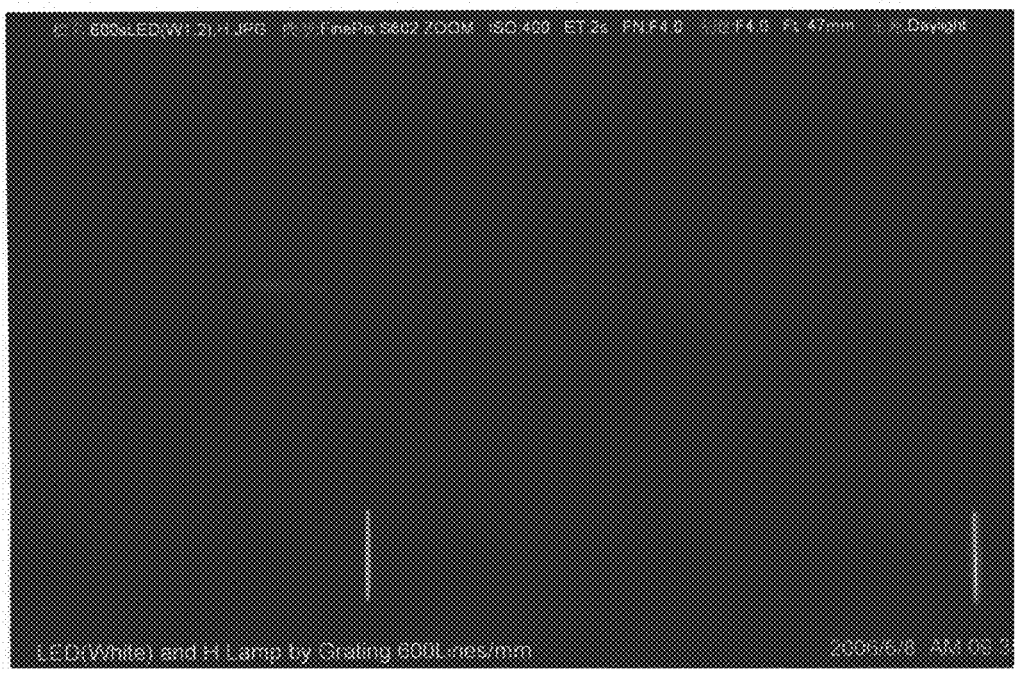
FIG. 23 is a digital spectrograph of the fifth experiment with the digital spectrophotometer in FIG. 1.
Figure 24:
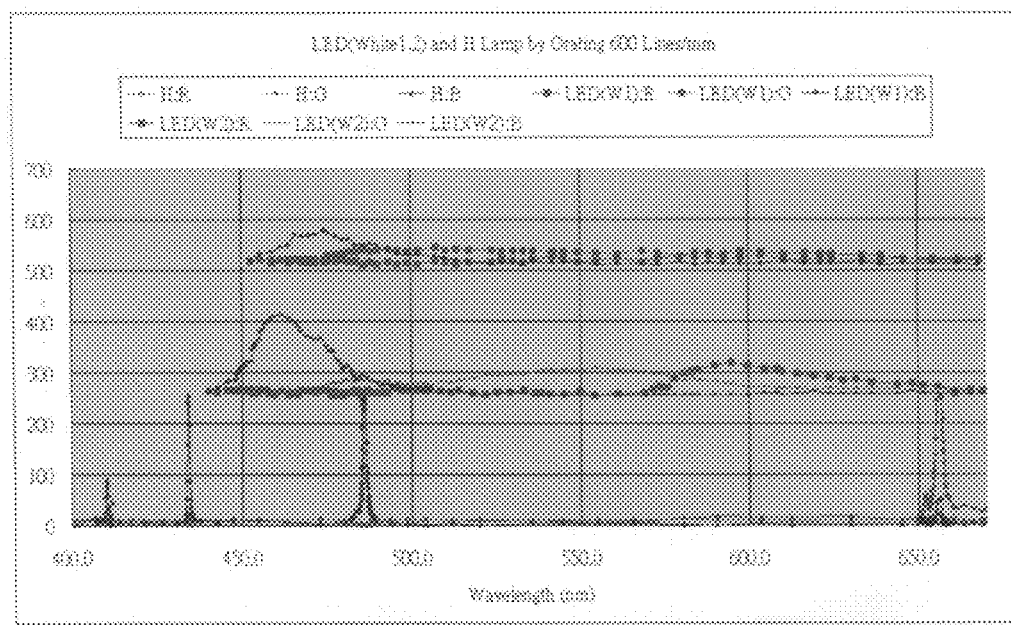
FIG. 24 is a coordinates diagram of the fifth experiment with the digital spectrophotometer in FIG. 1.

With reference to FIG. 23, a fifth experiment with the digital spectrophotometer has a hydrogen-Lamp (H) as the reference illuminant (234), two white-LEDs as the determine illuminants (234) with an incident angle $\theta=17°$ shooting from the grating (23531) into the photographic device (32). The distance between the illuminants (234) and the photographic device (32) is D=3.20 m. The width of the grating (23531) is 600 lines/mm. The photographic device (32) is a digital camera of Fuji S602. Drafting a coordinates diagram as shown in FIG. 24 by transforming the color coordinates ($\chi$, R, G, B) as a coordinates ($\lambda$, R, G, B). The data of the wavelengths of H and the two white-LEDs are shown in FIG. 25.

Figure 26:
FIG. 26 is a digital spectrograph of the sixth experiment with the digital spectrophotometer in FIG. 1.
Figure 27:
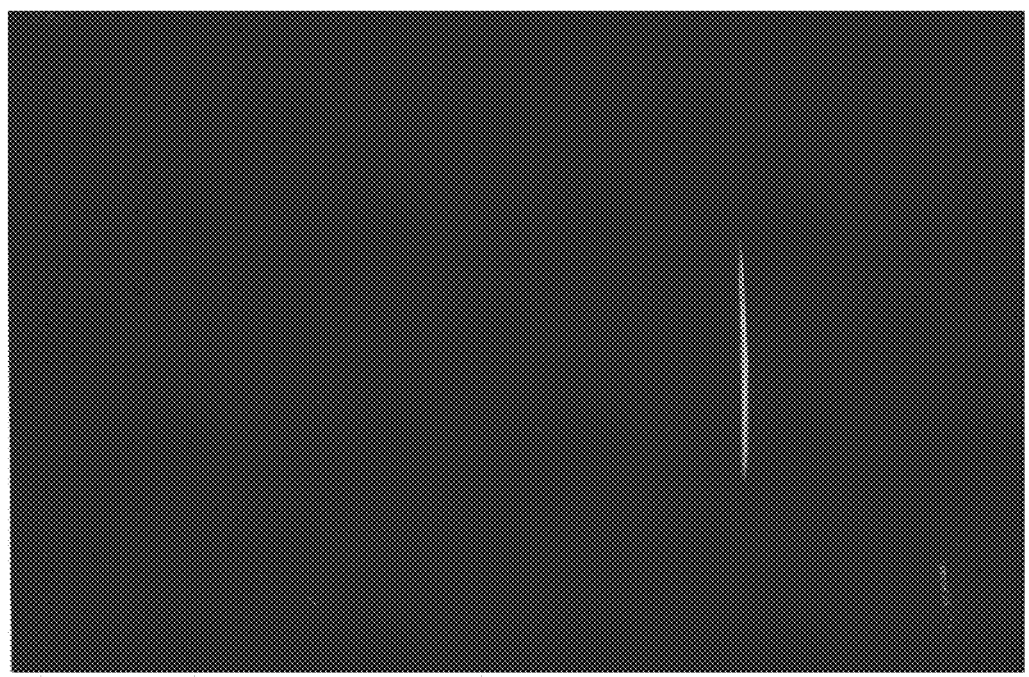
FIG. 27 is another digital spectrograph of the sixth experiment with the digital spectrophotometer in FIG. 1.
Figure 28:
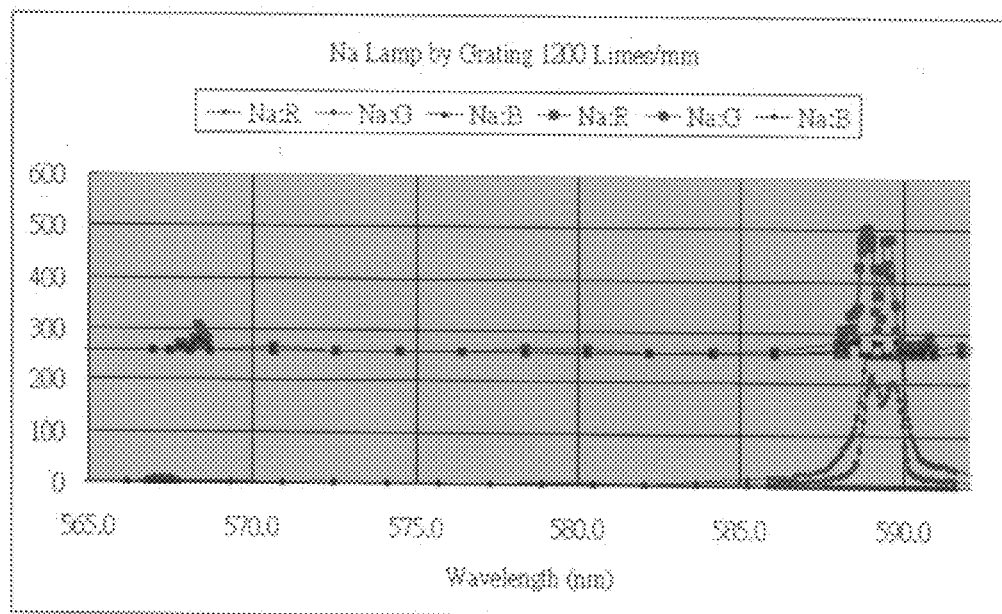
FIG. 28 is a coordinates diagram of the sixth experiment with the digital spectrophotometer in FIG. 1.

A sixth experiment with the digital spectrophotometer has a sodium-Lamp (Na) as the determine illuminant (234) vertical shooting from the grating (23531) into the photographic device (32). The width of the grating (23531) is 1200 lines/mm and the diffraction angle is 44°. The photographic devices (32) are respectively the digital camera of Fuji S602 and the conventional camera of Nikon FM2. With reference to FIGS. 26 and 27, the digital spectrographs are took by the digital camera of Fuji S602 and the conventional camera of Nikon FM2 respectively. Drafting a coordinates diagram as shown in FIG. 28 by transforming the color coordinates ($\chi$, R, G, B) as a coordinates ($\lambda$, R, G, B).

Users can calculate the wavelengths difference of the double-lines of sodium-Lamp according to the locations of the double-lines of sodium-Lamp ($\lambda$=589.6 nm and 589.0 nm) and the green-Lamp ($\lambda$=568.8 nm) and the formula of $$\frac{\Delta\lambda}{\Delta\chi} = \text{constant.}$$

The wavelengths difference ($\Delta\lambda$) of the double-lines of sodium-Lamp about 0.6 nm close to the theory value.

Figure 29:
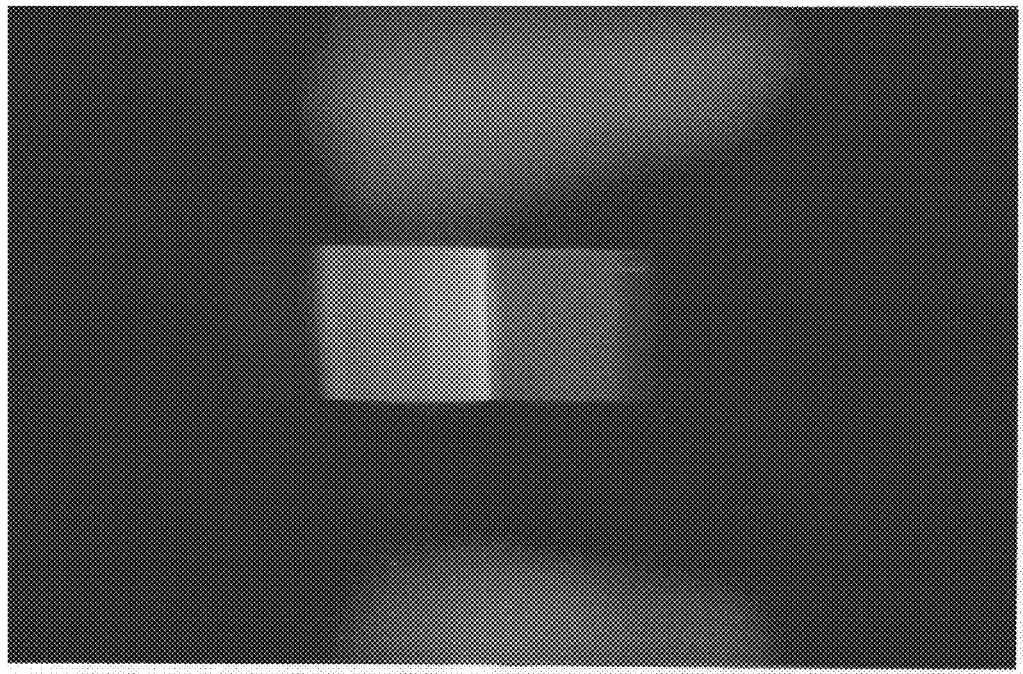
FIG. 29 is a digital spectrograph of the seventh experiment with the digital spectrophotometer in FIG. 1.
Figure 30:
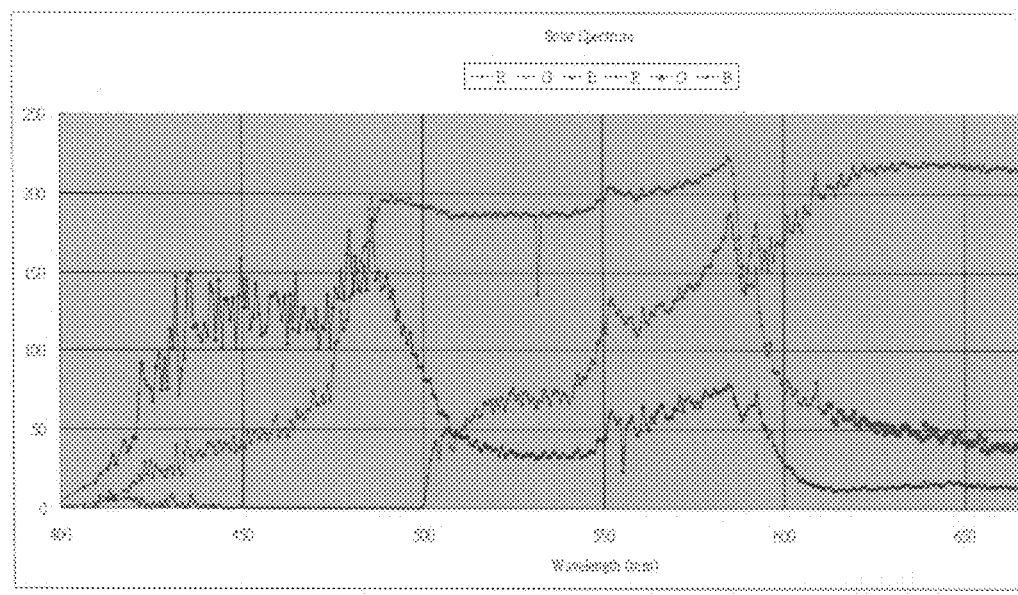
FIG. 30 is a coordinates diagram of the seventh experiment with the digital spectrophotometer in FIG. 1.

A seventh experiment with the digital spectrophotometer has sun as the determine illuminant (234) vertical shooting from the grating (23531) into the photographic device (32). The width of the grating (23531) is 600 lines/mm and the diffraction angle is 23°. The photographic device (32) is the digital camera of Fuji S602. With reference to FIG. 29, the digital spectrographs that took by the photographic device (32) can analysis the Fraunhofer-Lines of sun. Drafting a coordinates diagram as shown in FIG. 30 by transforming the color coordinates (χ, R, G, B) as a coordinates (λ, R, G, B).

Figure 31:
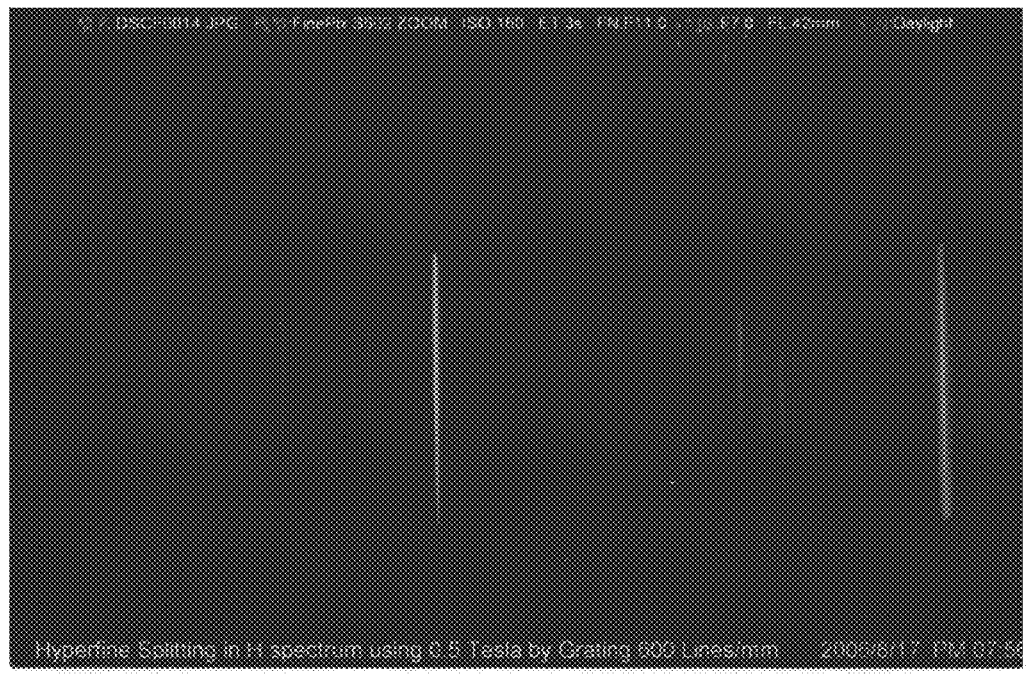
FIG. 31 is a digital spectrograph of the eighth experiment with the digital spectrophotometer in FIG. 1.
Figure 32:
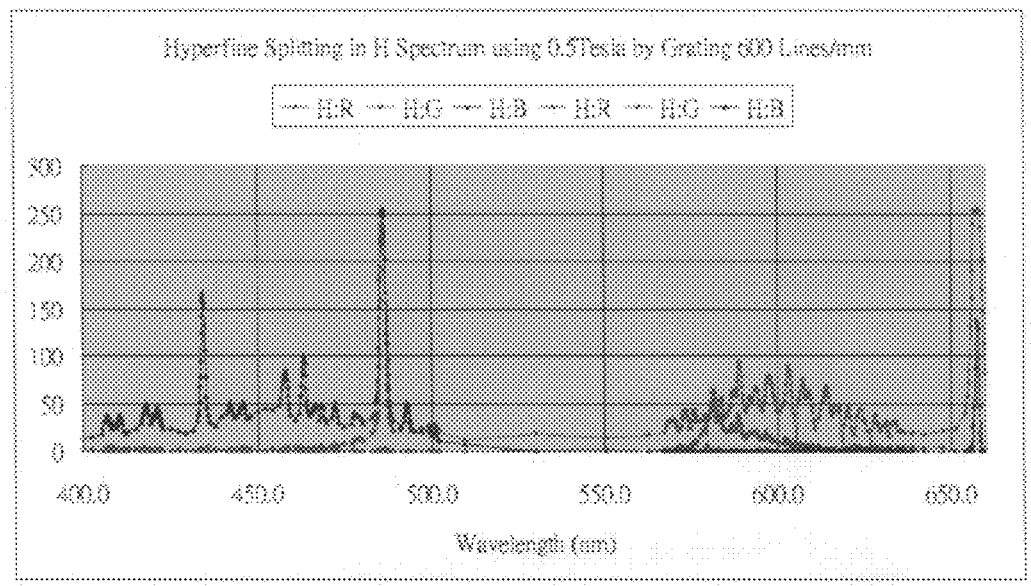
FIG. 32 is a coordinates diagram of the eighth experiment with the digital spectrophotometer in FIG. 1.

A eighth experiment with the digital spectrophotometer has a hydrogen-Lamp (H) as the determine illuminant (234) vertical shooting from the grating (23531) into the photographic device (32) with an external magnetic field about 0.5 Tesla to analysis the Zeeman Effect of the hydrogen-Lamp (H). The width of the grating (23531) is 600 lines/mm. The photographic device (32) is the digital camera of Fuji S602. With reference to FIG. 31, the digital spectrographs that took by the photographic device (32) can see the Zeeman Effect of the hydrogen-Lamp (H). Drafting a coordinates diagram as shown in FIG. 32 by transforming the color coordinates (χ, R, G, B) as a coordinates (λ, R, G, B).

The digital spectrophotometer as described has the following advantages.

1. The digital spectrophotometer is formed by the base (10), the operating assembly (20) and a photographic assembly (30) and has a smaller volume than a conventional monochromatic instrument. So, users can move the digital spectrophotometer easily and quickly and decrease the cost of the digital spectrographotometer.

2. The digital spectrophotometer can determine and analyze the wavelength-range of the light-emitting diodes, the double-lines of a sodium-lamp, the Fraunhofer-lines of the sun and the Zeeman Effect of a hydrogen-lamp (H) unambiguously and precisely.

3. Users only have to move the focusing lenses (232) and the diffraction grating (235) and rotate the spectrometer (23) to face the photographic assembly (30) so light from the illuminant (234) is emitted into the photographic device (32). Then, users can determine and analyze the illuminant (234) easily and quickly.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A digital spectrophotometer having
    a base having
        a middle; and
        a mounting plate being mounted on the middle of the base parallel to the base and having multiple mounting holes being formed through the mounting plate;
    an operating assembly being attached to the base and having an operating pedestal being attached parallel to the mounting plate on the base and having
        a front end;
        a rear end;
        multiple connecting holes being formed through the operating pedestal and aligning with the mounting holes in the mounting plate;
        multiple connectors extending respectively through the connecting holes and being mounted respectively in the mounting holes;
        a through hole being formed in the operating pedestal between the front end and the connecting holes; and
        an elongated slot being formed through the operating pedestal between the connecting holes and the rear end;
    a rotating frame being connected rotatably to the operating pedestal; and
    a spectrometer being connected solidly to the rotating frame and having
        a casing being connected solidly to the rotating frame;
        a diffraction grating being connected to the casing;
        an illuminant being defined near the casing;
        at least one focusing lens being slidably mounted inside the casing; and
        a collimator being mounted inside the casing; and
    a photographic assembly being connected to the operating pedestal and having
        a mounting post being extended through the elongated slot and connected to the operating pedestal and having an upper end; and
        a photographic device being connected to the upper end of the mounting post and faced to the spectrometer.

2. The digital spectrophotometer as claimed in claim 1, wherein the rotating frame has
    a mounting foot being connected to the operating pedestal in the through hole of the operating pedestal;
    a dial being connected to the mounting foot over the operating pedestal and having an angular scale defined on the dial near the elongated slot in the operating pedestal;
    a hub being connected rotatably to the mounting foot over the dial; and
    a mounting bracket being rectangular shaped, being connected solidly to the hub over the mounting foot and having
        a proximal end; and
        an indicator being formed in the proximal end of the mounting bracket over the angular scale on the dial.

3. The digital spectrophotometer as claimed in claim 2, wherein the casing is rectangular shaped, is connected solidly to the mounting bracket of the rotating frame over the dial and has
    a bottom being connected to the mounting bracket of the rotating frame;
    two sidewalls being connected to the bottom of the casing and each sidewall having
        two ends;
        two elongated holes being formed in a corresponding sidewall near the ends respectively; and
        two linear scales being defined respectively on a corresponding sidewall above the elongated holes;
    a top being connected to the sidewalls oppositely the bottom and having a mounting hole formed transversely through the top of the casing between the elongated holes;
    a front end; and
    a rear end.

4. The digital spectrophotometer as claimed in claim 3, wherein the illuminant is defined near the rear end of the casing and comprises a reference illuminant with a known wavelength and multiple determine illuminants with unknown wavelengths.

5. The digital spectrophotometer as claimed in claim 4, wherein the diffraction grating is connected to the front end of the casing and has
    a mounting frame being connected to the front end of the casing and having
        an upper edge;
        a lower edge;
        a center;
        a front surface;
        multiple mounting holes being formed on the upper edge and the lower edge of the mounting frame; and a through hole being formed through the center of the mounting frame;

two connecting strips being connected to the front surface of the mounting frame respectively around the through hole; and a grating plate being inserted between the mounting frame and the connecting strips over the dial and having a center; and a grating being formed in the center of the grating plate and communicated with the through hole in the mounting frame.

6. The digital spectrophotometer as claimed in claim 5, wherein each focusing lens has a bracket being slidably mounted inside the casing and having a center;

two knobs being extended respectively through the elongated holes in the sidewalls of the casing and connected to the bracket to adjust the bracket moving along the corresponding elongated holes in the casing;

two lens position indicators being connected to the knobs and abutted the sidewalls of the casing, corresponding to the linear scales on the sidewalls of the casing to indicate the location of the brackets;

a mounting recess being formed in the center of the bracket with a diameter; and a through hole being formed in the center of the bracket communicated with the mounting recess and having a diameter smaller than the diameter of the mounting recess;

a lens being mounted inside the mounting recess of the bracket to focus the illuminant; and a connecting plate being connected to the bracket near the mounting recess and having a through hole formed through the connecting plate and communicated with the mounting recess.

7. The digital spectrophotometer as claimed in claim 6, wherein the collimator has a seat being mounted inside the casing and aligned with the mounting hole in the casing and having a top;

a bottom;

a center;

an inner side;

multiple connecting holes being formed in the top of the seat;

a central through hole being formed through the center of the seat; and a transverse foot being formed transversely near the bottom of the seat;

a cover being connected to the top of the casing over the mounting hole and the seat and having multiple connecting holes formed in the cover and aligned with the connecting holes in the seat;

a mounting plate being connected to the front surface of the seat and contacted to the transverse foot and having a through hole formed through the mounting plate and communicated with the central through hole in the seat; and a collimating plate being inserted between the seat and the mounting plate and contacted to the transverse foot and having a slit formed in the collimating plate and communicated with the central through hole and the through hole.

8. The digital spectrophotometer as claimed in claim 7, wherein the base is H-shaped.

9. The digital spectrophotometer as claimed in claim 7, wherein the base is a photographic frame.

10. The digital spectrophotometer as claimed in claim 7, wherein the operating pedestal has a top; and a linear scale being defined on the top of the operating pedestal by a side of the elongated slot.

11. The digital spectrophotometer as claimed in claim 7, wherein the grating has a width and the width of the grating is 600 lines/mm.

12. The digital spectrophotometer as claimed in claim 7, wherein the grating has a width and the width of the grating is 1200 lines/mm.

13. The digital spectrophotometer as claimed in claim 7, wherein light from the illuminant is aligned vertical to the grating.

14. The digital spectrophotometer as claimed in claim 7, wherein light from the illuminant is aligned at an incident angle to the grating.

15. The digital spectrophotometer as claimed in claim 7, wherein the reference illuminant is a He—Ne Laser.

16. The digital spectrophotometer as claimed in claim 7, wherein the reference illuminant is hydrogen-Lamp.

17. The digital spectrophotometer as claimed in claim 7, wherein the photographic device is a digital camera.

18. The digital spectrophotometer as claimed in claim 7, wherein the photographic device is a conventional camera.

19. The digital spectrophotometer as claimed in claim 7, wherein the photographic device is a charge-coupled device (CCD).

20. The digital spectrophotometer as claimed in claim 1, wherein the casing is rectangular shaped, is connected solidly to the mounting bracket of the rotating frame over a dial and has a bottom being connected to a mounting bracket of the rotating frame;

two sidewalls being connected to the bottom of the casing and each sidewall having two ends;

two elongated holes being formed in a corresponding sidewall near the ends respectively; and two linear scales being defined respectively on a corresponding sidewall above the elongated holes;

a top being connected to the sidewalls oppositely the bottom and having a mounting hole formed transversely through the top of the casing between the elongated holes;

a front end; and a rear end.

21. The digital spectrophotometer as claimed in claim 20, wherein the illuminant is defined near the rear end of the casing and comprises a reference illuminant with a known wavelength and multiple determine illuminants with unknown wavelengths.

22. The digital spectrophotometer as claimed in claim 21, wherein the diffraction grating is connected to the front end of the casing and has a mounting frame being connected to the front end of the casing and having an upper edge;

a lower edge;

a center;

a front surface;

multiple mounting holes being formed on the upper edge and the lower edge of the mounting frame; and a through hole being formed through the center of the mounting frame;

two connecting strips being connected to the front surface of the mounting frame respectively around the through hole; and a grating plate being inserted between the mounting frame and the connecting strips over the dial and having a center; and a grating being formed in the center of the grating plate and communicated with the through hole in the mounting frame.

23. The digital spectrophotometer as claimed in claim 22, wherein each focusing lens has a bracket being slidably mounted inside the casing and having a center;

two knobs being extended respectively through the elongated holes in the sidewalls of the casing and connected to the bracket to adjust the bracket moving along the corresponding elongated holes in the casing;

two lens position indicators being connected to the knobs and abutted the sidewalls of the casing, corresponding to the linear scales on the sidewalls of the casing to indicate the location of the brackets;

a mounting recess being formed in the center of the bracket with a diameter; and a through hole being formed in the center of the bracket communicated with the mounting recess and having a diameter smaller than the diameter of the mounting recess;

a lens being mounted inside the mounting recess of the bracket to focus the illuminant; and a connecting plate being connected to the bracket near the mounting recess and having a through hole formed through the connecting plate and communicated with the mounting recess.

24. The digital spectrophotometer as claimed in claim 23, wherein the collimator has a seat being mounted inside the casing and aligned with the mounting hole in the casing and having a top;
a bottom;
a center;
an inner side;

multiple connecting holes being formed in the top of the seat;

a central through hole being formed through the center of the seat; and a transverse foot being formed transversely near the bottom of the seat;

a cover being connected to the top of the casing over the mounting hole and the seat and having multiple connecting holes formed in the cover and aligned with the connecting holes in the seat;

a mounting plate being connected to the front surface of the seat and contacted to the transverse foot and having a through hole formed through the mounting plate and communicated with the central through hole in the seat; and a collimating plate being inserted between the seat and the mounting plate and contacted to the transverse foot and having a slit formed in the collimating plate and communicated with the central through hole and the through hole.

25. The digital spectrophotometer as claimed in claim 1, wherein the base is H-shaped.

26. The digital spectrophotometer as claimed in claim 1, wherein the base is a photographic frame.

27. The digital spectrophotometer as claimed in claim 1, wherein the operating pedestal has a top; and a linear scale being defined on the top of the operating pedestal by a side of the elongated slot.

28. The digital spectrophotometer as claimed in claim 1, wherein the grating has a width and the width of the grating is 600 lines/mm.

29. The digital spectrophotometer as claimed in claim 1, wherein the grating has a width and the width of the grating is 1200 lines/mm.

30. The digital spectrophotometer as claimed in claim 1, wherein light from the illuminant is aligned vertical to the grating.

31. The digital spectrophotometer as claimed in claim 1, wherein light from the illuminant is aligned at an incident angle to the grating.

32. The digital spectrophotometer as claimed in claim 4, wherein the reference illuminant is a He—Ne Laser.

33. The digital spectrophotometer as claimed in claim 4, wherein the reference illuminant is hydrogen-Lamp.

34. The digital spectrophotometer as claimed in claim 1, wherein the photographic device is a digital camera.

35. The digital spectrophotometer as claimed in claim 1, wherein the photographic device is a conventional camera.

36. The digital spectrophotometer as claimed in claim 1, wherein the photographic device is a charge-coupled device (CCD).

* * * * *